United States Patent
Zhu et al.

(10) Patent No.: US 12,207,174 B2
(45) Date of Patent: Jan. 21, 2025

(54) COMMUNICATION METHOD AND RELATED APPARATUS

(71) Applicant: HUAWEI TECHNOLOGIES CO., LTD., Guangdong (CN)

(72) Inventors: Yuanping Zhu, Shanghai (CN); Zhenzhen Cao, Beijing (CN); Mingzeng Dai, Shenzhen (CN); Yibin Zhuo, Shenzhen (CN); Jing Liu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 278 days.

(21) Appl. No.: 17/401,587

(22) Filed: Aug. 13, 2021

(65) Prior Publication Data

US 2021/0377840 A1    Dec. 2, 2021

Related U.S. Application Data

(63) Continuation of application No. PCT/CN2020/075147, filed on Feb. 13, 2020.

(30) Foreign Application Priority Data

Feb. 15, 2019    (CN) .......................... 201910118003.8

(51) Int. Cl.
*H04W 40/02*    (2009.01)
*H04L 45/74*    (2022.01)
*H04L 69/321*    (2022.01)

(52) U.S. Cl.
CPC ............. *H04W 40/02* (2013.01); *H04L 45/74* (2013.01); *H04L 69/321* (2013.01)

(58) Field of Classification Search
CPC ................. H04W 40/02; H04W 40/22; H04W 28/065; H04L 45/74; H04L 69/321; H04L 69/22
(Continued)

(56) References Cited

U.S. PATENT DOCUMENTS 5,835,710 A * 11/1998 Nagami ............. H04Q 11/0478
                                                                    709/250
6,646,999 B1 * 11/2003 Kato ..................... H04W 92/02
                                                                    455/433
(Continued)

FOREIGN PATENT DOCUMENTS

CN            1156114 C  *  6/2004
CN          102780613 A     11/2012
(Continued)

OTHER PUBLICATIONS

ZTE, "3GPP TSG-RAN WG3 Meeting #100 R3-182788," Considerations on adaptation layer in IAB, May 25, 2018 (May 25, 2018). (Year: 2018).*

(Continued)

*Primary Examiner* — Jae Y Lee
*Assistant Examiner* — Oladiran Gideon Olaleye
(74) *Attorney, Agent, or Firm* — Fish & Richardson P.C.

(57) ABSTRACT

This disclosure provides communications methods and apparatuses. One method comprises: receiving, by a first entity of an adaptation layer in a network node, a data packet sent by an entity of a lower protocol layer of the adaptation layer, wherein the data packet comprising an adaptation layer header and an adaptation layer payload; and processing the data packet in response to determining whether the network node is a destination node that the data packet is routed to at the adaptation layer.

20 Claims, 15 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2004/0052257 A1* | 3/2004 | Abdo | H04L 43/00 370/392 |
| 2004/0167988 A1* | 8/2004 | Rune | H04L 12/4616 709/230 |
| 2006/0046733 A1* | 3/2006 | Fauconnier | H04L 1/1657 455/450 |
| 2018/0205427 A1 | 7/2018 | Ghosh et al. | |
| 2019/0037616 A1 | 1/2019 | Zhang | |
| 2019/0053301 A1 | 2/2019 | Hampel et al. | |

FOREIGN PATENT DOCUMENTS

| | | | | |
|---|---|---|---|---|
| CN | 104993969 A | | 10/2015 | |
| CN | 107959631 A | * | 4/2018 | ............ H04L 45/10 |
| CN | 108809897 A | * | 11/2018 | ............ H04L 29/06 |
| WO | WO-2016161915 A1 | * | 10/2016 | ............ H04W 76/20 |
| WO | WO-2018145292 A1 | * | 8/2018 | |

OTHER PUBLICATIONS

3GPP TSG-RAN WG3 Meeting, "Considerations on adaptation layer in IAB" #100 R3-182788 (Year: 2018).*
3GPP TS 38.300 V15.4.0 (Dec. 2018), "3rd Generation Partnership Project; Technical Specification Group Radio Access Network;NR; NR and NG-RAN Overall Description;Stage 2(Release 15)," Dec. 2018, 97 pages.
Huawei, "Destination Address and Forwarding Path based Routing for IAB," 3GPP TSG-RAN WG3 Meeting#99bis, R3-181997, Sanya, China, Apr. 16-20, 2018, 4 pages.
Huawei et al., "Destination Address and Forwarding Path based Routing for IAB," 3GPP TSG-RAN WG2 #103bis R2-1815545, Chengdu, China, Oct. 8-12, 2018, 5 pages.
Huawei, "Route selection method for architecture IAN," 3GPP TSG-RAN WG3 #101bis, Chengdu, China, Oct. 8-12, 2018, R3-185968, 5 pages.
Huawei, Hisilicon, "Adaptation layer based L2 relaying and light L2 relaying," 3GPP TSG-RAN WG2 #101bis, R2-1806126, Sanya, China, Apr. 16-20, 2018, 9 pages.
Huawei, HiSilicon, "Comparison of L2 and L3 relay architectures," 3GPP TSG-RAN WG2 Ad Hoc, R2-1801132, Vancouver, Canada, Jan. 22-26, 2018, 3 pages.
Intel Corporation, "Handling on RAN paging and MO data for AS triggered events," 3GPP TSG RAN WG2 Meeting #102, R2-1807359, Busan, Korea, May 21-25, 2018, 2 pages.
Office Action issued in Chinese Application No. 201910118003.8 on Feb. 20, 2021, 16 pages (with English translation).
OPPO, "Discussion on User Plane for IAB," 3GPP TSG-RAN2 Meeting #102, R2-1806693, Busan, Korea, May 21-25, 2018, 5 pages.
PCT International Search Report and Written Opinion issued in International Application No. PCT/CN2020/075147 on Apr. 26, 2020, 15 pages (with English translation).
ZTE, "Considerations on adaptation layer in IAB," 3GPP TSG-RAN WG2 Meeting #102 R2-1807395, Busan, Korea, May 21-25, 2018, 5 pages.
ZTE, "Considerations on adaptation layer in IAB," 3GPP TSG-RAN WG3 Meeting #100, R3-182788, Busan, Korea, May 21-25, 2018, 5 pages.
Ericsson, "Adaptation Layer Header Content," 3GPP TSG-RAN WG2 Meeting #105, R2-1901325, Athens, Greece, Feb. 25-Mar. 1, 2019, 3 pages.
Extended European Search Report issued in European Application No. 20756292.7 on Feb. 22, 2022, 13 pages.
Huawei, HiSilicon, "Adaptation layer design," 3GPP TSG-RAN WG2 Ad Hoc, R2-1810675, Montreal, Canada, Jul. 2-6, 2018, 5 pages.
Huawei, HiSilicon, "BAP layer header content design," 3GPP TSG-RAN WG2 meeting #106, R2-1906985, Reno, Nevada, USA, May 13-17, 2019, 4 pages.
Huawei, HiSilicon, "Consideration about adaptation layer placement," 3GPP TSG-RAN WG2 #103, R2-1812754, Gothenburg, Sweden, Aug. 20-24, 2018, 5 pages.
Huawei, HiSilicon, "Consideration about adaptation layer placement," 3GPP TSG-RAN WG2 #103, R2-1813285, Gothenburg, Sweden, Aug. 20-24, 2018, 10 pages.
Huawei, Hisilicon, "IAB node access procedure for architecture group 1," 3GPP TSG-RAN WG2 Ad Hoc, R2-1810743, Montreal, Canada, Jul. 2-6, 2018, 6 pages.
Office Action issued in Chinese Application No. 202110780778.9 on Feb. 11, 2022, 18 pages (with English translation).
Nokia, Nokia Shanghai Bell, Architecture and Protocols: MAC adaptation layer based IAB. 3GPP TSG-RAN WG3#99, R3-180993, Athens, Greece, Feb. 26-Mar. 2, 2018, 6 pages.
Qualcomm Incorporated, "Functional view of IAB adaptation layer," 3GPP TSG-RAN WG2 Meeting #105, R2-1900811, Athens, Greece, Feb. 15-Mar. 1, 2019, 5 pages.

* cited by examiner (a) User plane protocol stacks of nodes in a multi-hop IAB network

TO (b) Control plane protocol stacks of nodes in a multi-hop IAB network

Note: Adapt in (a) and (b) refers to an adaptation layer, Donor-DU in (a) and (b) refers to a donor-DU, and Donor-CU in (a) and (b) refers to a donor-CU (a) User plane protocol stacks of nodes in a multi-hop IAB network

TO (b) Control plane protocol stacks of nodes in a multi-hop IAB network

Note: Adapt in (a) and (b) refers to an adaptation layer, Donor-DU in (a) and (b) refers to a donor-DU, and Donor-CU in (a) and (b) refers to a donor-CU

| D/C | Control information type | Routing information | Information about an RB of a terminal | Reserved | Header compression feedback Information |

COMMUNICATION METHOD AND RELATED APPARATUS

CROSS-REFERENCE TO RELATED APPLICATIONS

This application is a continuation of International Application No. PCT/CN2020/075147, filed on Feb. 13, 2020, which claims priority to Chinese Patent Application No. 201910118003.8, filed on Feb. 15. 2019. The disclosures of the aforementioned applications are hereby incorporated by reference in their entireties.

TECHNICAL FIELD

This application relates to the field of communications technologies, and in particular, to a communication method and a related apparatus.

BACKGROUND

In a network including an integrated access and backhaul (integrated access and backhaul, IAB for short) node, there are multi-hop and multi-connectivity scenarios. To be specific, a plurality of nodes (for example, a plurality of IAB nodes) may simultaneously serve a terminal, and the terminal may transmit a data packet through a plurality of hops of IAB nodes. That is, one transmission path may include at least one wireless backhaul link and one radio access link. In discussion of a current communication standard, it is proposed that an adaptation layer (namely, Adaptation layer, referred to as an Adapt layer for short in this specification for ease of description) is introduced into a wireless backhaul link. However, a procedure of processing a data packet at the Adapt layer of the wireless backhaul link is not defined in the current communication standard, and an improper data packet processing procedure causes a case in which a data packet cannot be correctly transmitted on the wireless backhaul link.

SUMMARY

Embodiments of this application provide a communication method and a related apparatus, to correctly transmit a data packet on a wireless backhaul link.

To achieve the foregoing objective, the embodiments of this application provide the following technical solutions.

According to a first aspect, a communication method is provided. The method includes: receiving, by a first entity in one or more adaptation layer entities of a network node, a data packet that is delivered by a protocol layer entity of a lower protocol layer and that includes an adaptation layer header and an adaptation layer payload; determining, by the first entity, whether the network node is a destination node to which the data packet is routed at an adaptation layer; and processing, by the first entity, the data packet based on a determining result.

The first entity is located on a receive side of the network node.

According to the method provided in the first aspect, whether the network node is the destination node of the routing at the adaptation layer directly affects a subsequent data packet processing process. Therefore, the network node processes the data packet based on the determining result of whether the network node is the destination node of the routing at the adaptation layer, to correctly process the data packet, thereby avoiding an error in the data packet processing process.

In a possible implementation, the determining result is that the network node is the destination node to which the data packet is routed at the adaptation layer, and the processing, by the first entity of the network node, the data packet based on a determining result includes: delivering, by the first entity of the network node, the adaptation layer payload of the data packet to a second entity, where the second entity is a protocol layer entity of a protocol layer of an F1 interface or a protocol layer entity of an upper protocol layer of the adaptation layer.

In this possible implementation, when the network node is the destination node to which the data packet is routed at the adaptation layer, for example, when the network node is an access IAB node, a donor node, or a donor-DU, because a next-hop node of the data packet has no adaptation layer, the network node may deliver the adaptation layer payload to the second entity, to avoid a problem that the next-hop node of the data packet cannot parse the data packet.

In a possible implementation, the determining result is that the network node is the destination node to which the data packet is routed at the adaptation layer, and the processing, by the first entity of the network node, the data packet based on a determining result includes: performing, by the first entity of the network node, header decompression on the adaptation layer payload of the data packet; and delivering the adaptation layer payload obtained after the header decompression to a second entity.

In this possible implementation, when the network node is the destination node to which the data packet is routed at the adaptation layer, for example, when the network node is an access IAB node, a donor node, or a donor-DU, because a next-hop node of the data packet has no adaptation layer, if header compression is performed on the adaptation layer payload of the data packet in an IAB network, the network node further needs to perform the header decompression on the adaptation layer payload, to avoid a problem that the next-hop node of the data packet cannot perform the header decompression on the adaptation layer payload of the data packet.

In a possible implementation, the determining result is that the network node is the destination node to which the data packet is routed at the adaptation layer, and the processing, by the first entity of the network node, the data packet based on a determining result includes: performing, by the first entity of the network node, header decompression on the data packet; and delivering the adaptation layer payload of the data packet obtained after the header decompression to a second entity.

In this possible implementation, when the network node is the destination node to which the data packet is routed at the adaptation layer, for example, when the network node is an access IAB node, a donor node, or a donor-DU, because a next-hop node of the data packet has no adaptation layer, if header compression is performed on the data packet in an IAB network, the network node further needs to perform the header decompression on the data packet, to avoid a problem that the next-hop node of the data packet cannot perform the header decompression on the data packet and cannot parse the data packet.

In a possible implementation, the determining result is that the network node is the destination node to which the data packet is routed at the adaptation layer, and the processing, by the first entity of the network node, the data packet based on a determining result includes: storing, by the first entity of the network node, the data packet in a butler of the adaptation layer.

In this possible implementation, if the data packet is a control PDU, because the network node needs to obtain, based on the control PDU, information included in the control the first entity of the network node stores the data packet in the buffer of the adaptation layer, to perform further processing, thereby ensuring correct processing on the data packet.

In a possible implementation, the determining result is that the network node is not the destination node to which the data packet is routed at the adaptation layer, and the processing, by the first entity of the network node, the data packet based on a determining result includes: delivering, by the first entity of the network node, the data packet to a third entity, where the third entity is a protocol layer entity of a protocol layer of a wireless backhaul interface or a protocol layer entity of a lower protocol layer of the adaptation layer.

The third entity in the first aspect is located on a transmit side of the network node.

In this possible implementation, when the network node is not the destination node to which the data packet is routed at the adaptation layer, for example, when the network node is an intermediate IAB node, because a next-hop node of the data packet has an adaptation layer, the network node may directly deliver the data packet to the third entity instead of removing the adaptation layer header, so that the next-hop node of the data packet may forward the data packet or perform other processing at the adaptation layer based on the adaptation layer header of the data packet, thereby ensuring correct transmission of the data packet.

In a possible implementation, the determining result is that the network node is not the destination node to which the data packet is routed at the adaptation layer, and the processing, by the first entity of the network node, the data packet based on a determining result includes: delivering, by the first entity of the network node, the adaptation layer payload of the data packet and information in the adaptation layer header of the data packet to a third entity, where the third entity is a protocol layer entity of a protocol layer of a wireless backhaul interface or a protocol layer entity of a lower protocol layer of the adaptation layer.

In this possible implementation, when the network node is not the destination node to which the data packet is routed at the adaptation layer, for example, when the network node is an intermediate IAB node, because a next-hop node of the data packet has an adaptation layer, when sending the adaptation layer payload, the network node further needs to deliver the information in the adaptation layer header to the third entity, so that the next-hop node of the data packet may forward the data packet or perform other processing at the adaptation layer based on the information in the adaptation layer header, thereby ensuring correct transmission of the data packet.

In a possible implementation, the determining result is that the network node is not the destination node to which the data packet is routed at the adaptation layer, and the processing, by the first entity of the network node, the data packet based on a determining result includes: performing, by the first entity of the network node, header decompression on the adaptation layer payload of the data packet; and delivering, to a third entity, the adaptation layer payload obtained after the header decompression and information in the adaptation layer header of the data packet, where the third entity is a protocol layer entity of a protocol layer of a wireless backhaul interface or a protocol layer entity of a lower protocol layer of the adaptation layer.

In this possible implementation, when the network node is not the destination node to which the data packet is routed at the adaptation layer, for example, when the network node is an intermediate IAB node, if a header compression manner is hop-by-hop header compression, a previous-hop node of the data packet performs header compression on the adaptation layer payload of the data packet. In this case, the first entity of the network node further needs to perform the header decompression on the adaptation layer payload In a possible implementation, the determining result is that the network node is not the destination node to which the data packet is routed at the adaptation layer, and the processing, by the first entity of the network node, the data packet based on a determining result includes: performing, by the first entity of the network node, header decompression on the data packet; and delivering, to a third entity, the adaptation layer payload of the data packet obtained after the header decompression and information in the adaptation layer header of the data packet obtained after the header decompression, where the third entity is a protocol layer entity of a protocol layer of a wireless backhaul interface or a protocol layer entity of a lower protocol layer of the adaptation layer.

In this possible implementation, when the network node is not the destination node to which the data packet is routed at the adaptation layer, for example, when the network node is an intermediate IAB node, if a header compression manner is hop-by-hop header compression, a previous-hop node of the data packet performs header compression on the data packet. In this case, the first entity of the network node further needs to perform the header decompression on the data packet.

In a possible implementation, the: data packet is a data PDU of the adaptation layer.

In a possible implementation, the data packet is the control PDU of the adaptation layer.

In a possible implementation, the method further includes one or more of the following: determining, by the first entity of the network node, the next-hop node of the data packet, and delivering, by the first entity of the network node to the third entity, information used to indicate the next-hop node; or delivering, by the first entity of the network node, an identifier of a first service differentiation channel to the third entity, where the first service differentiation channel is a service differentiation channel from which the data packet received by the first entity comes; and the service differentiation channel is a logical channel, an RLC channel, or an RLC bearer; or determining, by the first entity of the network node, a second service differentiation channel for delivering the data packet to the next-hop node of the data packet; and delivering, by the first entity of the network node, an identifier of the second service differentiation channel to the third entity, where the second service differentiation channel is a service differentiation channel used by the third entity to send the data packet; and the service differentiation channel is a logical channel, an RLC, channel, or an RLC bearer.

In this possible implementation, the first entity of the network node may further deliver the next-hop node and/or the second service differentiation channel of the data packet to the third entity, or deliver information used to determine the next-hop node and/or information used to determine the second service differentiation channel (namely, the identifier of the first service differentiation channel) of the data packet, to ensure that the third entity correctly delivers the data packet to the lower protocol layer.

In a possible implementation, the determining, by the first entity of the network node, whether the network node is a destination node to which the data packet is routed at an adaptation layer includes: determining, by the first entity of the network node, whether the network node is the destination node to which the data packet is routed at the adaptation layer based on one or more of routing information in the adaptation layer header of the data packet, whether the adaptation layer header of the data packet includes the routing information, or whether the data packet is the control PDU.

In this possible implementation, a plurality of methods for determining whether the network node is the destination node to which the data packet is routed at the adaptation layer are provided, so that this application can be used in different scenarios.

According to a second aspect, a network node is provided. The network node includes: an obtaining unit, configured to receive a data packet that is delivered by a protocol layer entity of a lower protocol layer of an adaptation layer of the network node and that includes an adaptation layer header and an adaptation layer payload; a judging unit, configured to determine whether the network node is a destination node to which the data packet is routed at the adaptation layer; and a processing unit, configured to process the data packet based on a determining result.

The network node according to the second aspect is configured to perform the method provided in the first aspect. Therefore, for beneficial effects of the network node provided in the second aspect, refer to the method provided in the first aspect. Details are not described herein again.

According to a third aspect, a communication method is provided. The communication method includes: receiving, by a third entity of a network node, a data packet from a first entity, where both the first entity and the third entity are adaptation layer entities; and delivering, by the third entity of the network node, the data packet to a fourth entity through a second service differentiation channel, where the fourth entity is a protocol layer entity of a lower protocol layer of an adaptation layer; the second service differentiation channel corresponds to a next-hop node of the data packet; and the service differentiation channel is a logical channel, an RLC channel, or an RLC bearer.

The first entity of the network node is located on a receive side of the network node, and the third entity of the network node is located on a transmit side of the network node.

According to the method provided in the third aspect, the third entity of the network node delivers the data packet to the fourth entity through the second service differentiation channel corresponding to the next-hop node of the data packet, so that it can be ensured that the data packet is correctly transmitted to the next-hop node of the data packet.

In a possible implementation, when the data packet is a data packet including an adaptation layer payload, the method further includes: adding, by the third entity of the network node, an adaptation layer header to the data packet; and the delivering, by the third entity of the network node, the data packet to a fourth entity through a second service differentiation channel includes: delivering, by the third entity of the network node to the fourth entity through the second service differentiation channel, the data packet to which the adaptation layer header is added.

In this possible implementation, the third entity of the network node may add the adaptation layer header to the data packet, so that a subsequent node forwards the data packet or performs other processing based on information in the adaptation layer header.

In a possible implementation, the method further includes one or more of the following: determining, by the third entity of the network node, the next-hop node for the data packet; or determining, by the third entity of the network node, the second service differentiation channel for the data packet.

In this possible implementation, the third entity of the network node may determine the next-hop node and/or the second service differentiation channel for delivering the data packet, to ensure that the third entity correctly delivers the data packet to the lower protocol layer.

In a possible implementation, the determining, by the third entity of the network node, the second service differentiation channel for the data packet includes: determining, by the third entity of the network node, the second service differentiation channel based on a first service differentiation channel, where the first service differentiation channel is a service differentiation channel from which the data packet received by the first entity comes.

In a possible implementation, the determining, by the third entity of the network node, the second service differentiation channel for the data packet includes: determining, by the third entity of the network node, the second service differentiation channel based on an identifier of an RB of a terminal to which the data packet belongs; and/or a correspondence between the RB of the terminal and a service differentiation channel.

In a possible implementation, the determining, by the third entity of the network node, the second service differentiation channel for the data packet includes: determining, by the third entity of the network node, the second service differentiation channel based on a QoS label carried in the data packet and a correspondence between the QoS label and a service differentiation channel.

In a possible implementation, the determining, by the third entity of the network node, the second service differentiation channel for the data packet includes: receiving, by the third entity of the network node, an identifier of the second service differentiation channel from the first entity; and determining, by the third entity of the network node, the second service differentiation channel based on the identifier of the second service differentiation channel.

In the third aspect, a plurality of methods for determining the second service differentiation channel are provided, so that the method can be flexibly used in different scenarios.

In a possible implementation, the determining, by the third entity of the network node, the next-hop node for the data packet includes: receiving, by the third entity of the network node from the first entity, information used to indicate the next-hop node; and determining, by the third entity of the network node, the next-hop node based on the information used to indicate the next-hop node.

In a possible implementation, before the adding, by the third entity of the network node, an adaptation layer header to the data packet, the method further includes: performing, by the third entity of the network node, header compression on the data packet. In this possible implementation, the third entity of the network node performs the header compression on the data packet, so that header overheads of the data packet in a wireless backhaul link transmission process can be reduced, and air interface resource consumption can be reduced.

In a possible implementation, the method further includes: performing, by the third entity of the network node, header compression on the data packet to which the adaptation layer header is added; and the delivering, by the third entity of the network node to the fourth entity through the second service differentiation channel, the data packet to which the adaptation layer header is added includes: delivering, by the third entity of the network node to the fourth entity through the second service differentiation channel, the data packet to which the adaptation layer header is added and on which the header compression is performed. In this possible implementation, the third entity of the network node performs the header compression on the data packet, so that header overheads of the data packet in a wireless backhaul link transmission process can be reduced, and air interface resource consumption can be reduced.

According to a fourth aspect, a network node is provided. The network node includes: an obtaining unit, configured to receive a data packet from a first entity in one or more adaptation layer entities; and a delivery unit, configured to deliver the data packet to a fourth entity through a second service differentiation channel, where the fourth entity is a protocol layer entity of a lower protocol layer of an adaptation layer; the second service differentiation channel corresponds to a next-hop node of the data packet; and the service differentiation channel is a logical channel, an RLC channel, or an RLC bearer.

The network node according to the fourth aspect is configured to perform the method provided in the third aspect. Therefore, for beneficial effects of the network node provided in the fourth aspect, refer to the method provided in the third aspect. Details are not described herein again.

According to a fifth aspect, a communication method is provided. The communication method includes: receiving, by a first entity of a network node, a data packet from a fifth entity and adding an adaptation layer header to the data packet, where the fifth entity is a protocol layer entity of a protocol layer of an F1 interface or a protocol layer entity of an upper protocol layer of an adaptation layer, the first entity is an adaptation layer entity, and the data packet is a data packet including an adaptation layer payload; and delivering, by the first entity of the network node to a sixth entity through a third service differentiation channel, the data packet to which the adaptation layer header is added, where the sixth entity is a protocol layer entity of a lower protocol layer of the adaptation layer; the third service differentiation channel corresponds to a next-hop node of the data packet; and the service differentiation channel is a logical channel, an RLC channel, or an RLC bearer.

According to the method provided in the fifth aspect, the first entity of the network node delivers the data packet to the sixth entity through the third service differentiation channel corresponding to the next-hop node of the data packet, so that it can be ensured that the data packet is correctly transmitted to the next-hop node of the data packet.

In a possible implementation, the method further includes one or more of the following: determining, by the first entity of the network node, the next-hop node of the data packet; or determining, by the first entity of the network node, the third service differentiation channel.

In this possible implementation, the first entity of the network node may determine the next-hop node and/or the third service differentiation channel for delivering the data packet, to ensure that the first entity correctly delivers the data packet to the lower protocol layer.

In a possible implementation, before the adding, by a first entity of a network node, an adaptation layer header to the data packet, the method further includes: performing, by the first entity of the network node, header compression on the data packet. In this possible implementation, the first entity of the network node performs the header compression on the data packet, so that header overheads of the data packet in a wireless backhaul link transmission process can be reduced, and air interface resource consumption can be reduced.

In a possible implementation, the method further includes: performing, by the first entity of the network node, header compression on the data packet to which the adaptation layer header is added; and the delivering, by the first entity of the network node to a sixth entity through a third service differentiation channel, the data packet to which the adaptation layer header is added includes: delivering, by the first entity of the network node to the sixth entity through the third service differentiation channel, the data packet to which the adaptation layer header is added and on which the header compression is performed. In this possible implementation, the first entity of the network node performs the header compression on the data packet, so that header overheads of the data packet in a wireless backhaul link transmission process can be reduced, and air interface resource consumption can be reduced.

According to a sixth aspect, a network node is provided. The network node includes: an obtaining unit, configured to receive a data packet from a fifth entity, where the fifth entity is a protocol layer entity of a protocol layer of an F1 interface or a protocol layer entity of an upper protocol layer of an adaptation layer, and the data packet is a data packet including an adaptation layer payload; an adding unit, configured to add an adaptation layer header to the data packet; and a delivery unit, configured to deliver, to a sixth entity through a third service differentiation channel, the data packet to which the adaptation layer header is added, where the sixth entity is a protocol layer entity of a lower protocol layer of the adaptation layer; the third service differentiation channel corresponds to a next-hop node of the data packet; and the service differentiation channel is a logical channel, an RLC channel, or an RLC bearer.

The network node according to the sixth aspect is configured to perform the method provided in the fifth aspect. Therefore, for beneficial effects of the network node provided in the sixth aspect, refer to the method provided in the fifth aspect. Details are not described herein again.

According to a seventh aspect, an adaptation layer re-establishment method is provided. The method includes: sending, by an upper protocol layer of an adaptation layer of a network node, adaptation layer re-establishment indication information to the adaptation layer of the network node; receiving, by the adaptation layer of the network node, the adaptation layer re-establishment indication information from the upper protocol layer; and re-establishing, by the adaptation layer of the network node, the adaptation layer based on the adaptation layer re-establishment indication information.

According to the method provided in the seventh aspect, when an IAB network topology is changed, the Adapt layer of the network node may be re-established, to provide assurance for lossless data transmission, avoid a packet loss problem caused by a topology change of a wireless backhaul link, and improve data transmission reliability.

In a possible implementation, the re-establishing, by the adaptation layer of the network node, the adaptation layer based on the adaptation layer re-establishment indication information includes: configuring, by the adaptation layer of the network node, one or more of a new adaptation layer routing and forwarding table or a new bearer mapping relationship based on the adaptation layer re-establishment indication information.

In a possible implementation, the method further includes: retransmitting, by the adaptation layer of the network node, an unsuccessfully sent data packet to a next-hop node in the new adaptation layer routing and forwarding table based on the configured new adaptation layer routing and forwarding table. In this possible implementation, a packet loss of a terminal can be avoided by retransmitting the unsuccessfully sent data packet.

According to an eighth aspect, a network node is provided. The network node includes: a sending unit, configured to send adaptation layer re-establishment indication information to an adaptation layer of the network node; a receiving unit, configured to receive the adaptation layer re-establishment indication information from an upper protocol layer of the adaptation layer; and a re-establishment, configured to re-establish the adaptation layer based on the adaptation layer re-establishment indication information.

In a possible implementation, the sending unit is located at the upper protocol layer of the adaptation layer of the network node, and the receiving unit and the re-establishment unit are located at the adaptation layer of the network node.

In a possible implementation, the re-establishment unit is specifically configured to: configure one or more of a new adaptation layer routing and forwarding table or a new bearer mapping relationship based on the adaptation layer re-establishment indication information.

In a possible implementation, the sending unit is further configured to: retransmit an unsuccessfully sent data packet to a next-hop node in the new adaptation layer routing and forwarding table based on the configured new adaptation layer routing and forwarding table.

The network node according to the eighth aspect is configured to perform the method provided in the seventh aspect. Therefore, for beneficial effects of the network node provided in the eighth aspect, refer to the method provided in the seventh aspect. Details are not described herein again.

According to a ninth aspect, a network node is provided. The network node includes a processor. The processor is connected to a memory, the memory is configured to store a computer-executable instruction, and the processor executes the computer-executable instruction stored in the memory, to implement any method provided in the first aspect, the third aspect, the fifth aspect, or the seventh aspect. The memory and the processor may be integrated together, or may be independent devices. If the memory and the processor are independent devices, the memory may be located inside the network node, or may be located outside the network node.

In a possible implementation, the processor includes a logic circuit and an input interface and/or an output interface. The output interface is configured to perform a sending action in a corresponding method, and the input interface is configured to perform a receiving action in a corresponding method.

In a possible implementation, the network node further includes a communications interface and a communications bus, and the processor, the memory, and the communications interface are connected through the communications bus. The communications interface is configured to perform sending and receiving actions in a corresponding method. The communications interface may also be referred to as a transceiver. Optionally, the communications interface includes a transmitter and a receiver. In this case, the transmitter is configured to perform a sending action in a corresponding method, and the receiver is configured to perform a receiving action in a corresponding method.

In a possible implementation, the network node exists in a product form of a chip.

According to a tenth aspect, a computer-readable storage medium is provided. The computer-readable storage medium includes an instruction. When the instruction is run on a computer, the computer is enabled to perform any method according to the first aspect, the third aspect, the fifth aspect, or the seventh aspect.

According to an eleventh aspect, a computer program product including an instruction is provided. When the instruction is run on a computer, the computer is enabled to perform any method according to the first aspect, the third aspect, the fifth aspect, or the seventh aspect.

According to a twelfth aspect, a system chip is provided. The system chip is used in a network node, and the system chip includes at least one processor, where a related program instruction is executed in the at least one processor, to perform any method provided in the first aspect, the third aspect, the fifth aspect, or the seventh aspect.

According to a thirteenth aspect, a communications system is provided. The communications system includes one or more network nodes provided in the second aspect, the fourth aspect, the sixth aspect, or the eighth aspect.

For technical effects brought by any implementation of the ninth aspect to the thirteenth aspect, refer to the technical effects brought by a corresponding implementation of the first aspect, the third aspect, the fifth aspect, and the seventh aspect. Details are not described herein again.

It should be noted that, the various possible implementations of any one of the foregoing aspects may be combined on a premise that the solutions are not contradictory.

BRIEF DESCRIPTION OF DRAWINGS

FIG. 3 to FIG. 5B each are a schematic diagram of a protocol stack architecture according to an embodiment of this application;

DESCRIPTION OF EMBODIMENTS

Figure 1:
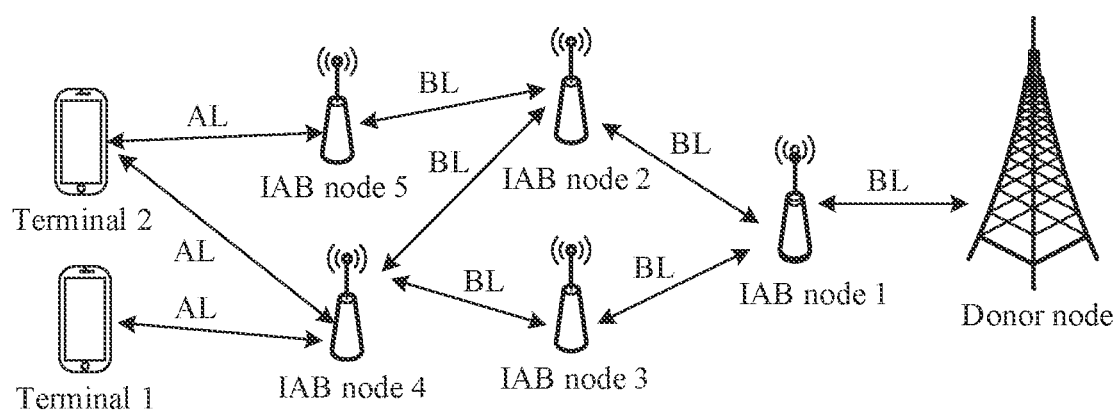
FIG. 1 is a schematic diagram of an IAB networking scenario according to an embodiment of this application.

The following describes the technical solutions in the embodiments of this application with reference to the accompanying drawings in the embodiments of this application. In the descriptions of this application, "/" means "or" unless otherwise specified. For example, A/B may represent A or B. The term "and/or" in this specification describes only an association relationship for associated objects and represents that, three relationships may exist. For example, A and/or B may represent the following three cases: Only A exists, both A and B exist, and only B exists. In addition, unless otherwise specified, "a plurality of" in the descriptions of this application means two or more than two. In addition, for convenience of clear description of the technical solutions in the embodiments of this application, in the embodiments of this application, terms such as "first", "second", and the like are used to distinguish same objects or similar objects whose functions and purposes are basically the same. A person skilled in the art may understand that the terms such as "first" and "second" do not limit a quantity or an execution sequence, and the terms such as "first" and "second" do not indicate a definite difference.

The technical solutions in the embodiments of this application may be used in various communications systems, such as an orthogonal frequency division multiple access (OFDMA) system, a single-carrier frequency division multiple access (SC-FDMA) system, and another system. The terms "system" and "network" can be interchanged with each other. The OFDMA system may implement wireless technologies such as evolved universal radio terrestrial access (E-UTRA) and ultra mobile broadband (UMB). The E-UTRA is an evolved version of a universal mobile telecommunications system (UMTS). A new E-UTRA release is used by the 3rd generation partnership project (3GPP) in long term evolution (LTE) and various releases evolved based on LTE. A 5th generation (5G) network using new radio (NR) is a next-generation communications system that is under research. In addition, the communications systems may further be applicable to a future-oriented communications technology, and are all applicable to the technical solutions provided in the embodiments of this application.

Network elements in this application include a terminal and a wireless backhaul node.

The terminal in the embodiments of this application may also be referred to as user equipment (UE), an access terminal, a subscriber unit, a subscriber station, a mobile station, a remote station, a remote terminal, a mobile device, a user terminal, a wireless communications device, a user agent, or a user apparatus. Alternatively, the terminal may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device that is connected to a wireless modem, a vehicle-mounted device, or a wearable device (which may also be referred to as a wearable intelligent device). The terminal may alternatively be a terminal in a next-generation communications system, for example, a terminal in a 5G network or a terminal in a future evolved public land mobile network (PLMN).

The wireless backhaul node is configured to provide a wireless backhaul service for a node (for example, a terminal) that accesses the wireless backhaul node in a wireless manner. The wireless backhaul service is a data and/or signaling backhaul service provided through a wireless backhaul link.

A system architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem. In the embodiments of this application, an example in which a provided method is used in an NR system or a 5G network is used for description. However, it should be noted that the method provided in the embodiments of this application may also be used in another network, for example, may be used in an evolved packet system (EPS) network (namely, a 4th generation (4G) network). Correspondingly, when the method provided in the embodiments of this application is used in the EPS network, a network node performing the method provided in the embodiments of this application is replaced with a network node in the EPS network. For example, when the method provided in the embodiments of this application is used in the 5G network or the NR system, a wireless backhaul node in the following descriptions may be a wireless backhaul node in the 5G network. For example, the wireless backhaul node in the 5G network may be referred to as an IAB node, and certainly may further have another name. This is not specifically limited in the embodiments of this application. When the method provided in the embodiments of this application is used in the EPS network, a wireless backhaul node in the following descriptions may be a wireless backhaul node in the EPS network. For example, the wireless backhaul node in the EPS network may be referred to as a relay node (RN).

With development of technologies such as virtual reality (VR), augmented reality (AR), and an internet of things, there will be an increasing quantity of terminals in a future network, and network data usage will also continuously increase. To adapt to the increasing quantity of terminals and the rapidly increasing network data usage in the market, a higher requirement is imposed on a capacity of the 5G network. In a hotspot area, to satisfy a requirement for an ultra-high capacity in the 5G network, high frequency small cell-based networking becomes increasingly popular. High frequency carriers have a relatively poor propagation feature, are severely attenuated by obstacles, and have small coverage. Therefore, a large quantity of small cells need to be densely deployed in the hotspot area. These small cells may be IAB nodes.

To design a flexible and convenient access and backhaul solution, a wireless transmission solution is used for both an access link (AL) and a backhaul link (BL) in an IAB scenario.

In a network including an IAB node (referred to as an IAB network for short below), the IAB node may provide a radio access service for a terminal, and is connected to a donor node through a wireless backhaul link for transmitting service data of a user. For example, the donor node may be a donor base station. The donor node may be briefly referred to as an IAB donor or a DgNB (namely, a donor gNodeB) in the 5G network. The donor node may be a complete entity, or may be in a form in which a centralized unit (CU) (referred to as a donor-CU or a CU for short in this specification) and a distributed unit (DU) (referred to as a donor-DU for short in this specification) are separated, that is, the donor node includes the donor-CU and the donor-DU. In the embodiments of this application and the accompanying drawings, an example in which the donor node includes the donor-CU and the donor-DU is used to describe the method provided in the embodiments of this application.

The donor-CU may alternatively be in a forum in which a user plane (UP) (referred to as a CU-UP for short in this specification) and a control plane (CP) (referred to as a CU-CP for short in this specification) a separated, that is, the donor-CU includes the CU-CP and the CU-UP.

The IAB node is connected to a core network through the donor node via a wired link. For example, in a standalone 5G network architecture, an IAB node is connected to a core network (5G core, 5GC) of the 5G network through a donor node via a wired link. In a non-standalone 5G network architecture, an IAB node is connected to an evolved packet core (EPC) through an evolved NodeB (eNB) on a control plane, and is connected to the EPC through a donor node and an eNB on a user plane.

To ensure service transmission reliability, an IAB network supports multi-hop IAB node networking and multi-connectivity IAB node networking. Therefore, there may be a plurality of transmission paths between a terminal and a donor node. On one path, there is a determined hierarchical relationship between IAB nodes, and between an IAB node and a donor node serving the IAB node. Each IAB node considers, as a parent node, a node providing a backhaul service for the IAB node. Correspondingly, the IAB node may be considered as a child node of the parent node of the IAB node.

For example, referring to FIG. 1, a parent node of an IAB node 1 is a donor node, the IAB node 1 is a parent node of an IAB node 2 and an IAB node 3, both the IAB node 2 and the IAB node 3 are parent nodes of an IAB node 4, and a parent node of an IAB node 5 is the IAB node 3. An uplink data packet of a terminal may be transmitted to the donor node through one or more IAB nodes, and then the donor node sends the uplink data packet to a mobile gateway device (for example, a user plane function (UPF) network element in a 5G network). After receiving a downlink data packet from the mobile gateway device, the donor node sends the downlink data packet to the terminal through the one or more IAB nodes. There are two available paths for data packet transmission between a terminal 1 and the donor node: the terminal 1→the IAB node 4→the IAB node 3→the IAB node 1→the donor node, and the terminal 1→the IAB node 4→the IAB node 2→the IAB node 1→the donor node. There are three available paths for data packet transmission between a terminal 2 and the donor node: the terminal 2→the IAB node 4→the IAB node 3→the IAB node 1→the donor node, the terminal 2→the IAB node 4→the IAB node 2→the IAB node 1→the donor node, and the terminal 2→the IAB node 5→the IAB node 2→the IAB node 1→the donor node.

It may be understood that, in an IAB network, one transmission path between a terminal and a donor node may include one or more IAB nodes. Each IAB node needs to maintain a wireless backhaul link to a parent node, and further needs to maintain a wireless link to a child node. If one IAB node is a node accessed by the terminal, a radio access link exists between the IAB node and a child node (namely, the terminal). If one IAB node is a node that provides a backhaul service for another IAB node, a wireless backhaul link exists between the IAB node and a child node (namely, the another IAB node). For example, referring to FIG. 1, in the transmission path "the terminal 1→the IAB node 4→the IAB node 3→the IAB node 1→the donor node", the terminal 1 accesses the IAB node 4 through a radio access link, the IAB node 4 accesses the IAB node 3 through a wireless backhaul link, the IAB node 3 accesses the IAB node 1 through a wireless backhaul link, and the IAB node 1 accesses the donor node through a wireless backhaul link.

For example, the IAB node may be a device such as customer-premises equipment (CPE) or a residential gateway (RG). In this case, the method provided in the embodiments of this application may further be used in a home access scenario.

The foregoing IAB networking scenario is merely an example. In an IAB scenario in which multi-hop and multi-connectivity are combined, there are more other possibilities. For example, an IAB node of one donor node is connected to another donor node, to form dual connectivity to serve a terminal. The possibilities are not listed one by one herein.

To make the embodiments of this application clearer, the following collectively describes some content and concepts related to the embodiments of this application.

1. Link, Previous-Hop Node of a Node, Next-Hop Node of a Node, Ingress Link of a Node, and Egress Link of a Node A link is a path between two adjacent nodes on a transmission path.

A previous-hop node of a node is a node that is on a transmission path including the node and that last receives a data packet before the node. The previous-hop node of the node may also be referred to as a previous-hop node of the data packet.

A next-hop node of a node is a node that is on a transmission path including the node and that first receives a data packet after the node. The next-hop node of the node may also be referred to as a next-hop node of the data packet.

An ingress link of a node is a link between the node and a previous-hop node of the node, and may also be referred to as a previous-hop link of the node.

An egress link of a node is a link between the node and a next-hop node of the node, and may also be referred to as a next-hop link of the node.

2. Access IAB Node and Intermediate IAB Node

In the embodiments of this application, an access IAB node is an IAB node accessed by a terminal, and an intermediate IAB node is an IAB node that provides a wireless backhaul service for another IAB node (for example, an access IAB node or another intermediate IAB node).

For example, referring to FIG. 1, in the transmission path "terminal 1→IAB node 4→IAB node 3→IAB node 1→donor node", the IAB node 4 is an access IAB node, and the IAB node 3 and the IAB node 1 are intermediate IAB nodes. The IAB node 3 provides a backhaul service for the IAB node 4, and the IAB node 1 provides a backhaul service for the IAB node 3.

It should be noted that an IAB node is an access IAB node for a terminal that accesses the IAB node, and an IAB node is an intermediate IAB node for a terminal that accesses another IAB node. Therefore, whether an IAB node is an access IAB node or an intermediate IAB node is not fixed, and needs to be determined based on a specific application scenario.

3. Components of an IAB Node

The IAB node may have a role of a mobile terminal (MT) and a role of a DU. When the IAB node communicates with a parent node of the IAB node, the IAB node may be considered as a terminal. In this case, the IAB node serves as the MT. When the IAB node communicates with a child node of the IAB node (where the child node may be a terminal or a terminal part of another IAB node), the IAB node may be considered as a network device. In this case, the IAB node serves as the DU. Therefore, it may be considered that the IAB node includes the MT and the DU. One IAB node may establish a backhaul connection to at least one parent node of the IAB node through an MT. A DU of an IAB node may provide an access service for a terminal or an MT of another IAB node.

Figure 2:
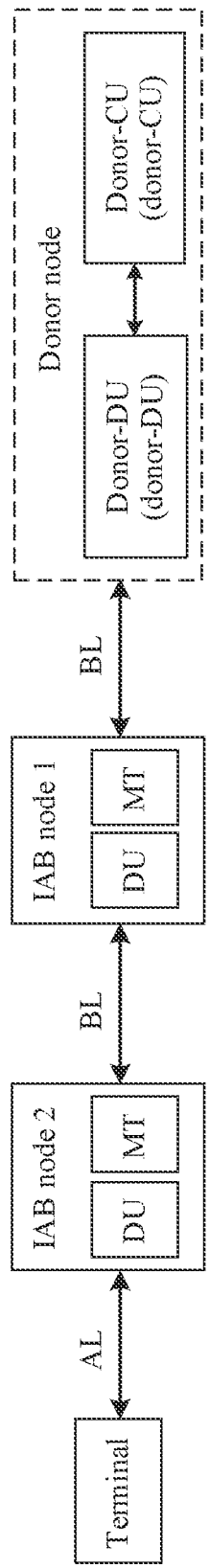
FIG. 2 is a schematic diagram of nodes on a transmission path according to an embodiment of this application.

For example, referring to FIG. 2, a terminal is connected to a donor node through an IAB node 2 and an IAB node 1. The IAB node 1 and the IAB node 2 each include a DU and an MT. The DU of the IAB node 2 provides an access service for the terminal. The DU of the IAB node 1 provides an access service for the MT of the IAB node 2. A donor-DU provides an access service for the MT of the IAB node 1.

4. Protocol Stack Architectures of an Intermediate IAB Node, an Access IAB Node, a Donor-DU, a Donor-CU, and a Terminal Protocol stacks of an intermediate IAB node on a user plane and a control plane are the same. An MT and a DU of the intermediate IAB node may not share an Adapt layer, for example, as shown in (a) in FIG. 3. Alternatively, an MT and a DU of the intermediate IAB node may share an Adapt layer, for example, as shown in (b) in FIG. 3.

Figure 3:
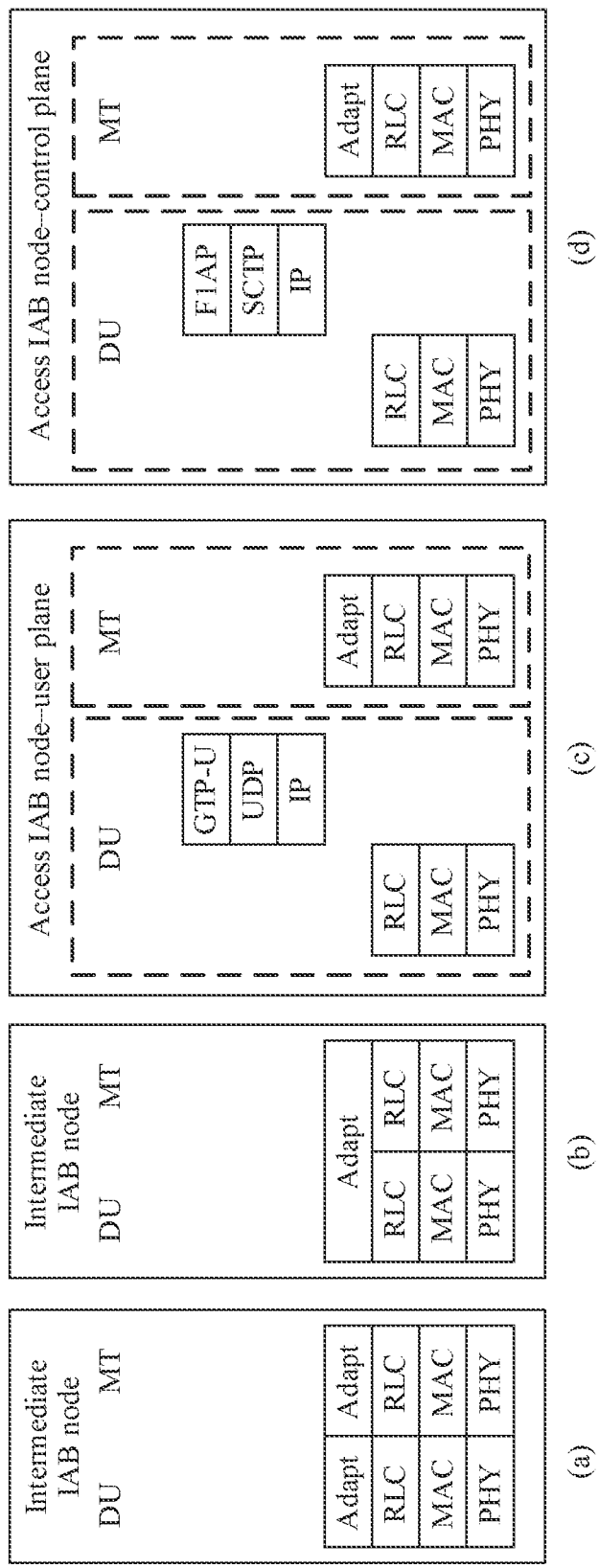

Protocol stacks of an access IAB node on a user plane and a control plane are different, refer to (c) in FIG. 3 and (d) in FIG. 3 respectively.

Figures 4A, 4B:
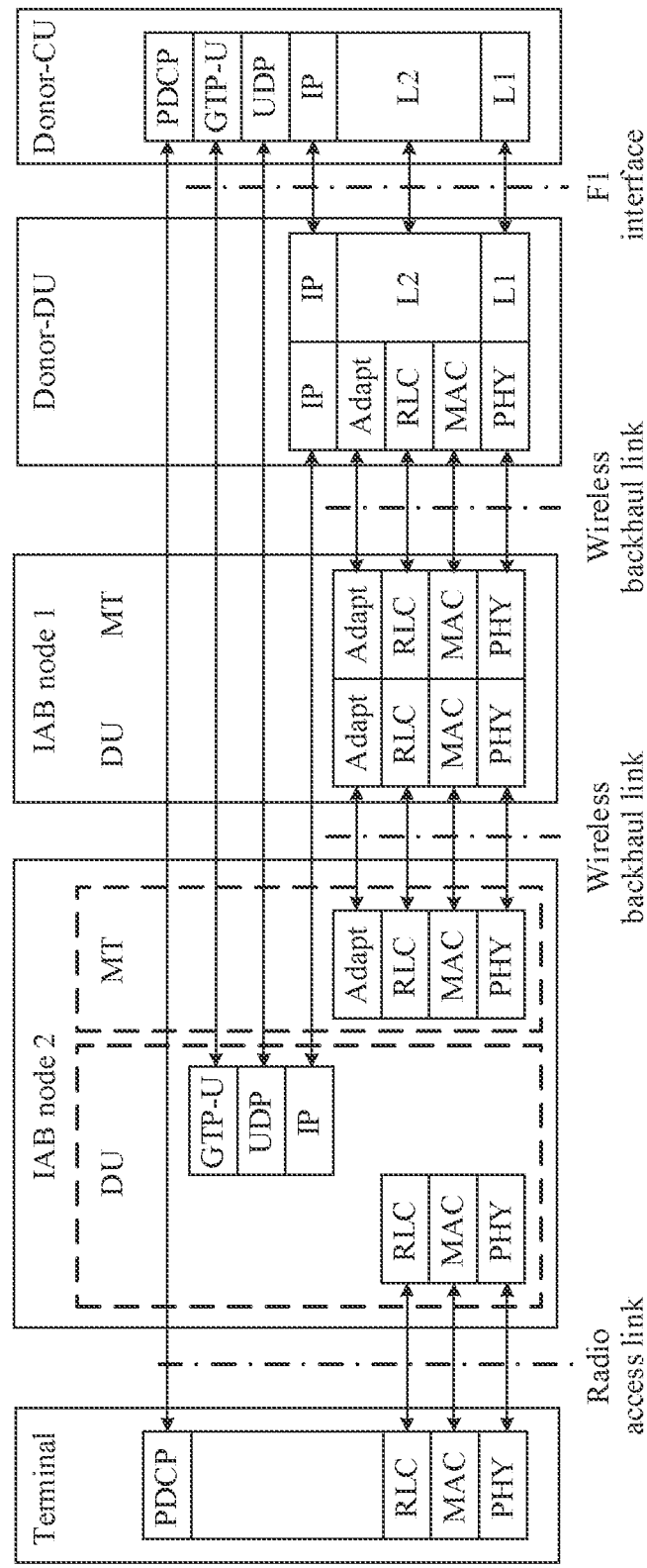
Figure 4B:
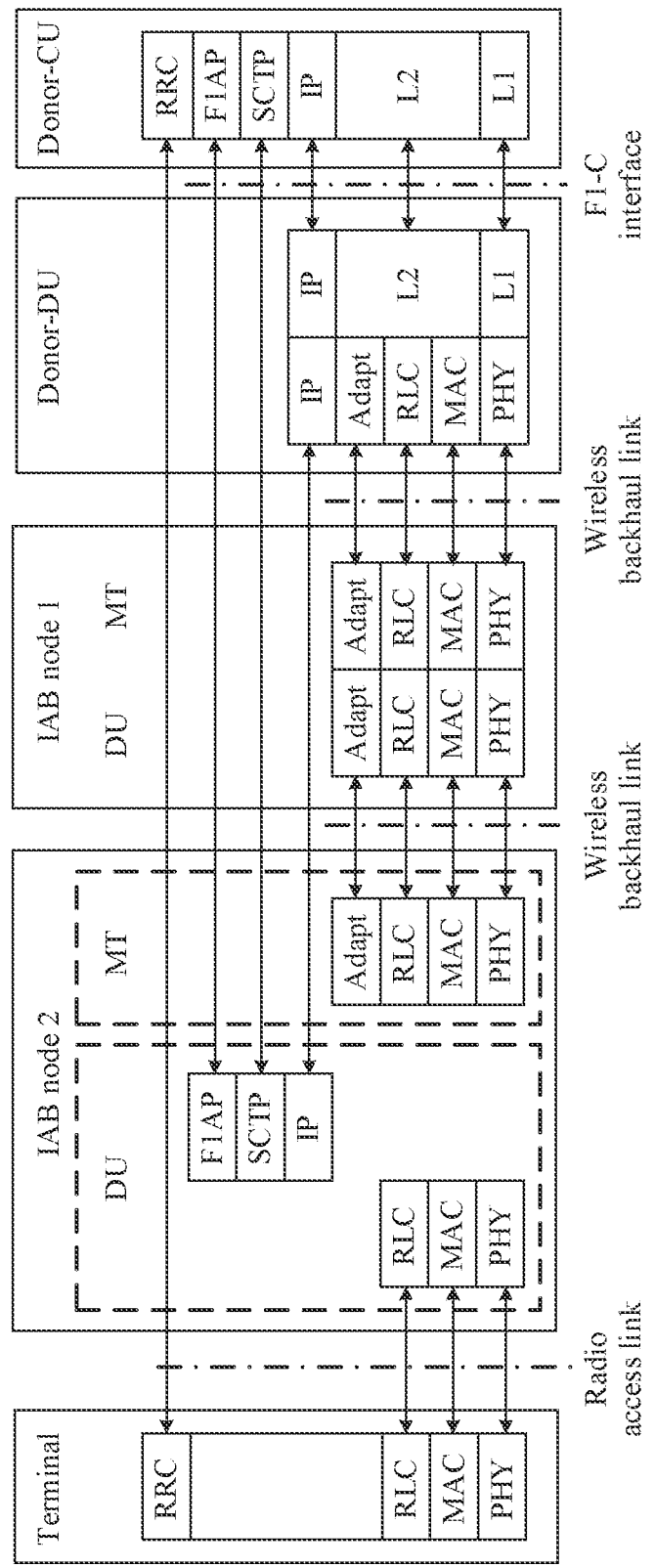
Figures 5A, 5B:
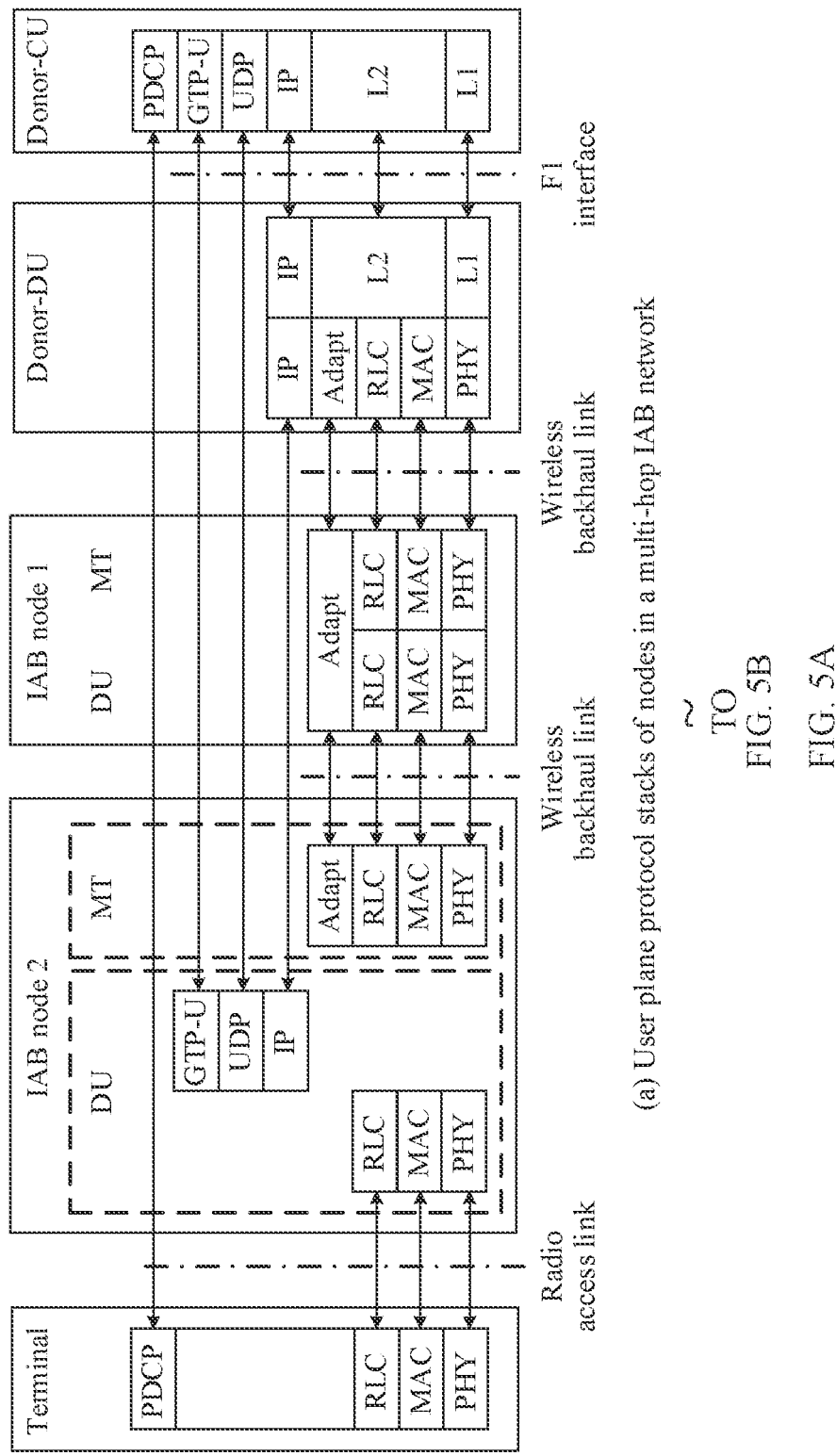
Figure 5B:
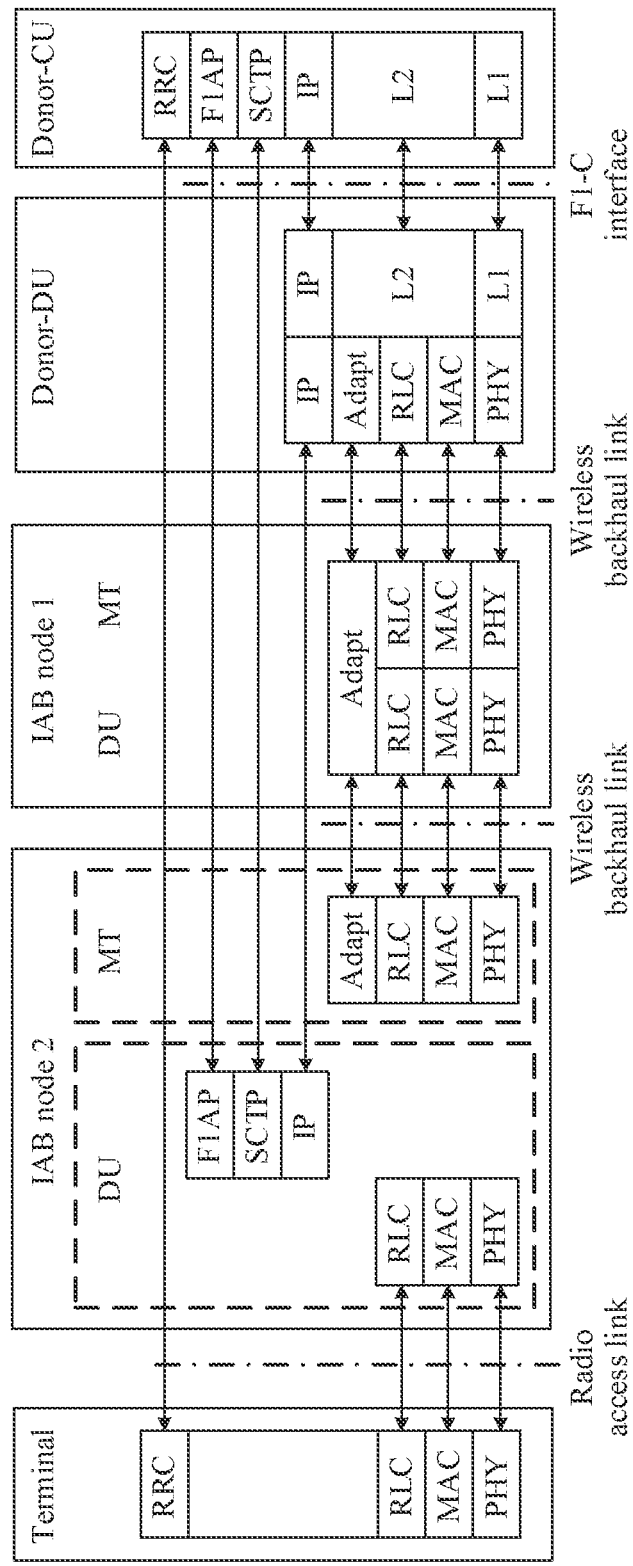

For example, based on an example shown in FIG. 3, for a user plane protocol stack architecture of each node, refer to (a) in FIG. 4A or (a) in FIG. 5A; and for a control plane protocol stack architecture of each node, refer to (b) in FIG. 4B or (b) in FIG. 5B. FIG. 4A and FIG. 4B are drawn by using an example in which an MT and a DU of an intermediate IAB node do not share an Adapt layer. FIG. 5A and FIG. 5B are drawn by using an example in which an MT and a DU of an intermediate IAB node share an Adapt layer.

Meanings of protocol layers in FIG. 3 to FIG. 5B are a packet data convergence protocol (PDCP) layer, a general packet radio service tunneling protocol-user plane (GTP-U) layer, a user datagram protocol (UDP) layer, an internet protocol (IP) layer, an L2 layer (layer 2), an L1 layer (layer 1), a radio link control (RLC) layer, a medium access control (MAC) layer, a physical (PHY) layer, a radio resource control (RRC) layer, an F1 application protocol (F1AP) layer, and a stream control transmission protocol (SCTP) layer. The L2 layer is a link layer. For example, the L2 layer may be a data link layer in an open systems interconnection (OSI) reference model. The L1 layer may be a physical layer. For example, the L1 layer may be a physical layer in an OSI reference model.

It should be noted that FIG. 4A and FIG. 4B are drawn by using an example in which a donor node includes a donor-DU and a donor-CU, FIG. 5A and FIG. 5B are drawn by using an example in which a donor node includes a donor-DU and a donor-CU. Therefore, FIG. 4A and FIG. 4B show protocol layers of the donor-DU and the donor-CU, and FIG. 5A and FIG. 5B show protocol layers of the donor-DU and the donor-CU. If the donor node is an entity with a complete function, the donor node only needs to retain protocol stacks of external node interfaces of the donor-DU and the donor-CU, and does not need a protocol layer on an internal interface between the donor-DU and the donor-CU.

In addition, it should be noted that, regardless of a control plane protocol stack architecture or a user plane protocol stack architecture, when the donor-DU is a proxy node of an F1 interface between the donor-CU and an IAB node, a protocol stack architecture that is of the donor-DU and that is oriented to the IAB node may further include, above an IP layer, a UDP layer and a GTP-U layer that are respectively peer layers of a UDP layer and a GTP-U layer in a protocol stack architecture of a DU of an access IAB node.

5. Protocol Layer of an F1 Interface and Protocol Layer of a Wireless Backhaul Interface An F1 interface is a logical interface between an IAB node (for example, a DU of the IAB node) and a donor node (or a donor-CU or a donor-DU). The F1 interface may also be referred to as an F1* interface, and supports a user plane and a control plane. A protocol layer of the F1 interface is a communications protocol layer on the F1 interface.

For example, a user plane protocol layer of the F1 interface may include one or more of an IP layer, a UDP layer, and a GTP-U layer. Optionally, the user plane protocol layer of the F1 interface further includes a PDCP layer and/or an IP security (IPsec) layer.

For example, a control plane protocol layer of the F1 interface may include one or more of an IP layer, an F1AP layer, and an SCTP layer. Optionally, the control plane protocol layer of the F1 interface further includes one or more of a PDCP layer, an IPsec layer, and a datagram transport layer security (DTLS) layer.

A wireless backhaul interface is a logical interface between IAB nodes or between an IAB node and a donor node (or a donor-DU). A protocol layer of the wireless backhaul interface is a communications protocol layer on the wireless backhaul interface. The protocol layer of the wireless backhaul interface includes one or more of the following protocol layers: an Adapt layer, an RLC layer, a MAC layer, and a PHY layer.

For example, a user plane protocol layer of the IAB node on the F1 interface includes a GTP-U layer, a UDP layer, and an IP layer. In one case, referring to (a) in FIG. 4A and (a) in FIG. 5A, the GTP-U layer and the UDP layer of the IAB node are peer layers of a GTP-U layer and a UDP layer of the donor-CU, and the IP layer of the IAB node is a peer layer of an IP layer of the donor-DU. In another case, the donor-DU is a proxy node of the F1 interface between the donor-CU and the IAB node, and the GTP-U layer, the UDP layer, and the IP layer of the IAB node are peer layers of a GTP-U layer, a UDP layer, and an IP layer of the donor-DU. It should be noted that, if security protection is considered for the F1 interface, the user plane protocol layer of the F1 interface may further include an IPsec layer and/or a PDCP layer. In a possible implementation, the IPsec layer or the PDCP layer is located above the IP layer and below the GTP-U layer.

For example, a control plane protocol layer of the IAB node on the F1 interface includes an F1AP layer, an SCTP layer, and an IP layer. In one case, referring to (b) in FIG. 4B and (b) in FIG. 5B, the F1AP layer and the SCTP layer of the IAB node are peer layers of an F1AP layer and an SCTP layer of the donor-CU, and the IP layer of the IAB node is a peer layer of an IP layer of the donor-DU. In another case, the donor-DU is a proxy node of the F1 interface between the donor-CU and the IAB node, and the F1AP layer, the SCTP layer, and the IP layer of the IAB node are peer layers of an F1AP layer, an SCTP layer, and an IP layer of the donor-DU. It should be noted that, if security protection is considered for the F1 interface, the control plane protocol layer of the F1 interface may further include one or more of an IPsec layer, a PDCP layer, and a DTLS layer. In a possible implementation, the IPsec layer, the PDCP layer, or the DTLS layer is located above the IP layer and below the F1AP layer.

It may be understood that when the protocol layer for the security protection is introduced into the protocol layers of the F1 interface, protocol stack architectures of some nodes in FIG. 3 to FIG. 5B are changed. For details, refer to the text for understanding. Protocol stack architectures of nodes in an IAB network shown in FIG. 3 to FIG. 5B in the embodiments of this application are merely examples. The method provided in the embodiments of this application does not depend on the examples, but makes, by using the examples, the method provided in the embodiments of this application easier to understand.

6. Transmit-Side Protocol Stack and Receive-Side Protocol Stack

In the embodiments of this application, a transmit-side protocol stack of a node is a protocol stack that is of the node and that is oriented to a next-hop node, and a receive-side protocol stack of a node is a protocol stack that is of the node and that is oriented to a previous-hop node.

For example, in the protocol stack architectures shown in FIG. 4A, FIG. 4B, FIG. 5A, and FIG. 5B, for uplink transmission, a terminal-oriented protocol stack of a DU of an access IAB node is a receive-side protocol stack, a donor node- or donor-CU-oriented protocol stack of the DU of the access IAB node is a transmit-side protocol stack, a protocol stack of an MT of the access IAB node is a transmit-side protocol stack, a protocol stack of a DU of an intermediate IAB node is a receive-side protocol stack, a protocol stack of an MT of the intermediate IAB node is a transmit-side protocol stack, an IAB node-oriented protocol stack of a donor-DU is a receive-side protocol stack, and a donor-CU-oriented protocol stack of the donor-DU is a transmit-side protocol stack. For downlink transmission, a terminal-oriented protocol stack of a DU of an access IAB node is a transmit-side protocol stack, a donor node- or donor-CU-oriented protocol stack of the DU of the access IAB node is a receive-side protocol stack, a protocol stack of an MT of the access IAB node is a receive-side protocol stack, a protocol stack of a DU of an intermediate IAB node is a transmit-side protocol stack, a protocol stack of an MT of the intermediate IAB node is a receive-side protocol stack, an IAB node-oriented protocol stack of a donor-DU is a transmit-side protocol stack, and a donor-CU-oriented protocol stack of the donor-DU is a receive-side protocol stack.

It should be noted that, for an intermediate IAB node whose MT and DU share an Adapt layer, a receive-side protocol stack includes an Adapt layer entity, and a transmit-side protocol stack also includes the Adapt layer entity.

In the following descriptions, the transmit-side protocol stack is referred to as a transmit side for short, and the receive-side protocol stack is referred to as a receive side for short.

7. Upper Protocol Layer and Lower Protocol Layer

In the embodiments of this application, a position relationship between protocol layers is defined as follows: In a process of sending data by a node, a protocol layer at which a data packet is processed first is above a protocol layer at which the data packet is processed later; in other words, the protocol layer at which the data packet is processed first may be considered as an upper protocol layer of the protocol layer at which the data packet is processed later. Alternatively, in a process of receiving data by a node, a protocol layer at which a data packet is processed first is below a protocol layer at which the data packet is processed later; in other words, the protocol layer at which the data packet is processed first may be considered as a lower protocol layer at which the data packet is processed later.

For example, referring to FIG. 3, in a protocol stack of an intermediate IAB node, an Adapt layer is an upper protocol layer of an RLC layer, a MAC layer, and a PHY layer, and the RLC layer, the MAC layer, and the PHY layer are lower protocol layers of the Adapt layer. In addition, it should be noted that, in the embodiments of this application, for one node, a transmit-side protocol stack may be considered as a lower-layer protocol stack of a receive-side protocol stack. For example, for an uplink data packet of an intermediate IAB node, an Adapt layer of an MT (namely, a transmit side) is a lower protocol layer of an Adapt layer of a DU (namely, a receive side).

It should be noted that, for a downlink data packet of an access IAB node, because both a protocol layer of an MT of the access IAB node and a donor node- or donor-CU-oriented protocol stack of a DU of the access IAB node are receive-side protocol stacks, an Adapt layer of the MT is a lower protocol layer of an IP layer of the DU. For an uplink data packet of an access IAB node, because both a protocol layer of an MT of the access IAB node and a donor node- or donor-CU-oriented protocol stack of a DU of the access IAB node are transmit-side protocol stacks, an Adapt layer of the MT is a lower protocol layer of an IP layer of the DU.

8. RLC Channel, RLC Bearer, and Logical Channel (LCH)

An RLC channel is a channel between an RLC layer and an upper protocol layer (for example, an Adapt layer). A logical channel is a channel between the RLC layer and a lower protocol layer (for example, a MAC layer). The logical channel may also be referred to as a MAC logical channel. An RLC bearer is an RLC entity and a MAC logical channel.

Currently, a configuration of a radio bearer (RB) of a terminal is correspondingly a configuration of a higher layer (for example, a PCP layer) part and a configuration of a lower layer (for example, an RLC layer and a MAC layer) part. A configuration of the RLC bearer is the configuration of the lower layer part corresponding to the RB, and specifically includes a configuration of the RLC layer entity and a configuration of the MAC logical channel. In this specification, an RLC bearer of an IAB node on a wireless backhaul link is a part including an RLC layer and a MAC logical channel. An RLC channel on the wireless backhaul link may be a channel between the RLC layer and a PDCP layer, or may be a channel between the RLC layer and an Adapt layer. This depends on an upper protocol layer of the RLC layer. The following uses an example in which the RLC channel is the channel between the RLC layer and the Adapt layer for description. The RLC channel of the IAB node on the wireless backhaul link corresponds one-to-one to an RLC layer entity, and also corresponds one-to-one to an RLC bearer. For details, refer to FIG. 7 for understanding.

The RB of the terminal may be a data radio bearer (DRB), or may be a signaling radio bearer (SRB).

For ease of description, the RLC channel, the RLC bearer, and the logical channel are collectively referred to as service differentiation channels in the following descriptions. In other words, the service differentiation channel in the following descriptions may be replaced with any one of the RLC channel, the RLC bearer, and the logical channel.

9. Service Data Unit (SDU) and Protocol Data Unit (PDU).

In a communications network, a data unit exchanged between peer protocol layer entities of different nodes is a PDU. A protocol layer transfers a PDU of the protocol layer to an adjacent lower protocol layer by using a service access point (SAP) (which may also be referred to as a service interface) provided by the lower protocol layer to the protocol layer, and the lower protocol layer indirectly exchanges the PDU of the protocol layer. The PDU of the protocol layer is used as an SDU of the lower protocol layer.

For example, for a protocol layer, if a data packet received by the protocol layer does not include a protocol layer header of the protocol layer, the data packet may be considered as an SDU of the protocol layer; or if a data packet received by the protocol layer includes a protocol layer header of the protocol layer, the data packet may be considered as a PDU of the protocol layer. For example, for an Adapt layer, if a data packet received by the Adapt layer does not include an Adapt layer header, the data packet may be considered as an SDU of the Adapt layer; or if a data packet received by the Adapt layer includes an Adapt layer header, the data packet may be considered as a PDU of the Adapt layer.

The PDU of the Adapt layer may be classified into a control PDU of the Adapt layer and a data PDU of the Adapt layer. In the data PDU of the Adapt layer, an Adapt layer payload includes user plane data and/or control plane signaling. In the control PDU of the Adapt layer, an Adapt layer payload includes Adapt layer feedback information, for example, flow control feedback information, header compression feedback information, or other feedback information or control information generated by the Adapt layer. The control PDU that is of the Adapt layer and that includes the header compression feedback information may be referred to as a header compression status report. The control PDU that is of the Adapt layer and that includes the flow control feedback information may be referred to as a flow control status report.

10. Composition of a Data Packet at an Adapt Layer

There may be two types of data packets at the Adapt layer, which are respectively denoted as a first-type data packet and a second-type data packet.

Figure 6:
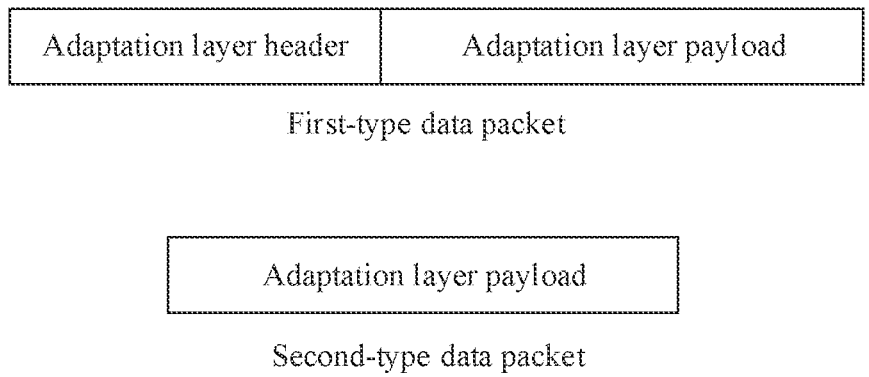
FIG. 6 is a schematic diagram of an adaptation layer data packet type according to an embodiment of this application.

Referring to FIG. 6, the first-type data packet refers to a data packet that includes an Adapt layer header and an Adapt layer payload. The second-type data packet is a data packet that includes an Adapt layer payload. The first-type data packet may also be referred to as an Adapt PDU. The Adapt layer payload may be control information, feedback information, or the like generated by an Adapt SDU or the Adapt layer.

The Adapt layer header may include routing information (which may also be referred to as routing-related information of the Adapt layer) and/or RB-related information of a terminal to which the data packet belongs, and may further include Adapt PDU type indication information, where the Adapt PDU type indication information is used to indicate whether a type of the Adapt PDU is a control PDU or a data PDU.

The routing information may be an identifier of a destination node of a routing at the Adapt layer, or an identifier of a cell served by a destination node of a routing at the Adapt layer, or an identifier of a transmission path at the Adapt layer. The destination node of the routing at the Adapt layer is the last node of the routing at the Adapt layer.

For the data PDU, in downlink transmission, the destination node of the routing at the Adapt layer may be an access IAB node; and in uplink transmission, the destination node of the routing at the Adapt layer may be a donor-DU.

For the control PDU, each IAB node may be the destination node of the routing at the Adapt layer.

The RB-related information (which may also be referred to as UE bearer information) of the terminal to which the data packet belongs may be: an identifier of the terminal+an identifier of an RB of the terminal (for example, a UE bearer specific ID), or may be "GTP TEID+TP address" corresponding to an RB of the terminal. The GTP TEID is a tunnel endpoint identifier (TEID) of a GTP tunnel.

11. Adapt Layer

The Adapt layer has one or more of the following capabilities: adding, to a data packet, routing information (Routing info) that can be identified by a wireless backhaul node; performing routing selection based on the routing information that can be identified by the wireless backhaul node; adding, to the data packet, identification information that can be identified by the wireless backhaul node and that is related to a quality of service (QoS) requirement; performing QoS mapping on a plurality of links including the wireless backhaul node for the data packet; adding data packet type indication information to the data packet; and sending flow control feedback information to a node having a flow control capability. It should be noted that a name of a protocol layer having these capabilities is not necessarily the Adapt layer. A person skilled in the art may understand that any protocol layer having these capabilities may be understood as the Adapt layer in the embodiments of this application.

The routing information that can be identified by the wireless backhaul node may be one or more types of information such as an identifier of a terminal, an identifier of an IAB node accessed by the terminal, an identifier of a donor node, an identifier of a donor-DU, an identifier of a donor-CU, and an identifier of a transmission path.

The QoS mapping on the plurality of links may be: mapping performed on a wireless backhaul link from an RB of the terminal to an RLC bearer, an RLC channel, or a logical channel on the wireless backhaul link based on an identifier that is of the RB of the terminal and that is carried in the data packet; or mapping performed from an RB, an RLC bearer, an RLC channel, or a logical channel on an ingress link to an RB, an RLC bearer, an RLC channel, or a logical channel on an egress link based on a correspondence or correspondences between any two or more of the RBs, the RLC bearers, the RLC channels, and the logical channels on the ingress link and the egress link.

The data packet type indication information may be used to indicate that content encapsulated at the Adapt layer includes any one or more of the following types: user plane data of the terminal, an RRC message of the terminal, an RRC message of the IAB node, a control layer application message (for example, an F1AP message) on an interface between the IAB node and the donor node (or the donor-CU or a CU-CP), a flow control feedback message generated by the IAB node, a header compression feedback message generated by the IAB node, a data PDU of the Adapt layer, a control PDU of the Adapt layer, and the like.

The identification information related to the QoS requirement may be a QoS flow identifier (QFI) of the terminal, an identifier of the RB of the terminal, a differentiated services code point (DSCP), a flow label in a header of an IP data packet of internet protocol version 6 (IPv6), and the like.

For example, the node having the flow control capability may be a node providing a backhaul service for the IAB node and may be, for example, the donor node, the donor-DU, the donor-CU, or a parent node of the IAB node. Content of the flow control feedback information may include one or more of the following information: a buffer status and a load degree of the IAB node, a status (for example, link blockage, link resume, or link quality information) of a link including the IAB node, a bandwidth and a transmission delay of a link including the IAB node, a sequence number of a data packet lost at the IAB node, a sequence number of a data packet successfully sent by the IAB node to the terminal or a child node of the IAB node.

In addition, in a possible case, a function of the Adapt layer may alternatively be extended from a function or functions of any one or more layers (for example, an RLC layer, a MAC layer, and a PDCP layer) included in a layer 2 without any additional protocol layer.

12. Adapt Layer Entity and RLC Layer Entity

It should be noted that one Adapt layer may include a plurality of Adapt layer entities, and one RLC layer may also include a plurality of RLC layer entities.

A quantity of Adapt layer entities included in an Adapt layer may be any one of the following case 1 to case 3:

Case 1: An Adapt layer includes one Adapt layer entity.

Figure 7:
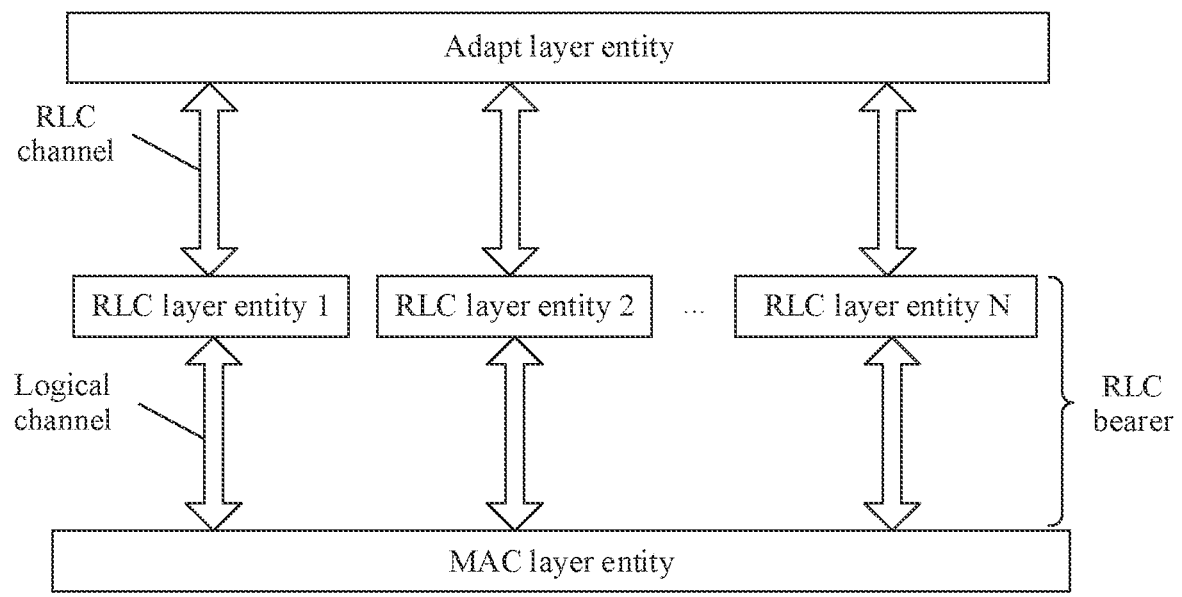
FIG. 7 to FIG. 9 each are a schematic diagram of a correspondence between an adaptation layer entity and an RLC layer entity according to an embodiment of this application.

In this case, referring to FIG. 7, the Adapt layer entity corresponds to N (where N is an integer greater than 0) RLC layer entities, there are N RLC channels between the Adapt layer entity and the N RLC layer entities, and the N RLC channels correspond one-to-one to the N RLC layer entities.

Figure 8:
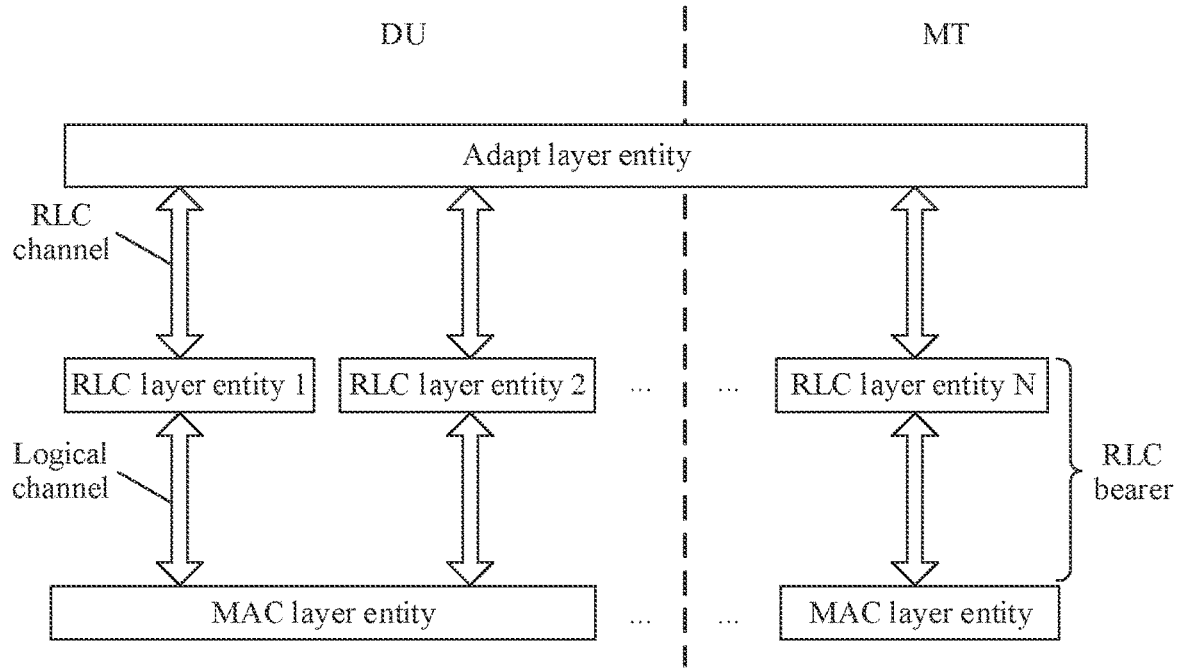

For an intermediate IAB node, if an MT and a DU of the intermediate IAB node share the Adapt layer, referring to FIG. 8, a part of N RLC layer entities are RLC layer entities included in an RLC layer of the MT of the intermediate IAB node, and the other part of the RLC layer entities are RLC layer entities included in an RLC layer of the DU of the intermediate IAB node.

Case 2: An Adapt layer of a node (denoted as a node A, and for example, the node A may be an IAB node, a donor node, or a donor-DU) includes M (where M is an integer greater than 0) Adapt layer entities, the M Adapt layer entities correspond one-to-one to M nodes, and the M nodes are one or more nodes that communicate with the node A.

In the embodiments of this application, a node that communicates with a network node (for example, the node A) is a node on which a receive side corresponding to a transmit side of the network node is located.

In this case, one Adapt layer entity corresponds to one node. For a correspondence between an Adapt layer entity and an RLC layer entity, refer to FIG. 7.

Case 3: An Adapt layer includes N Adapt layer entities, and the N Adapt layer entities correspond one-to-one to N RLC layer entities.

Figure 9:
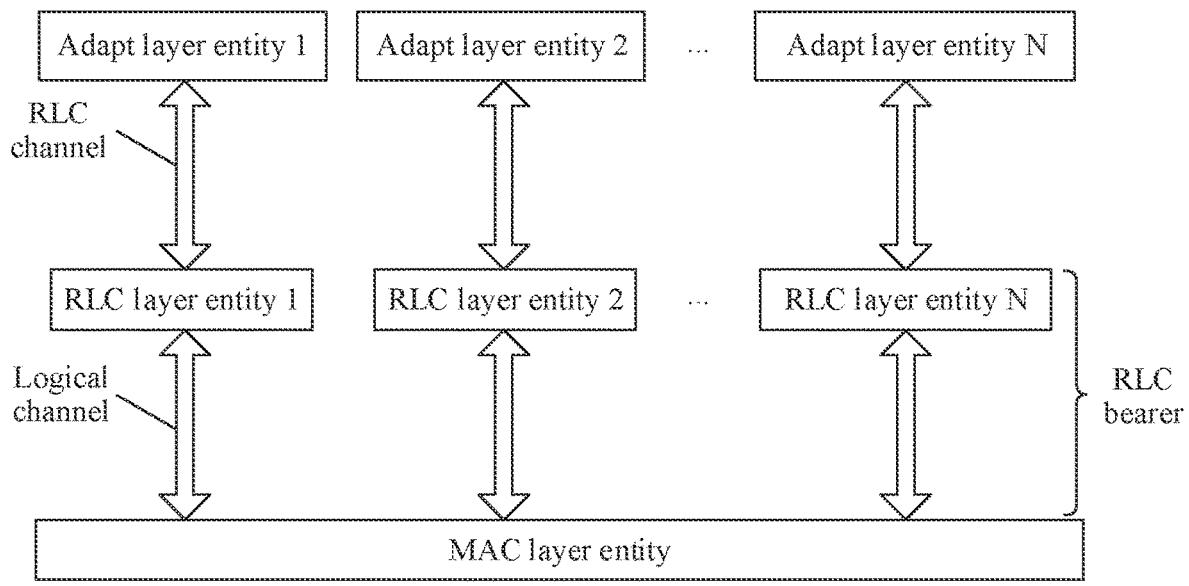

In this case, referring to FIG. 9, an RLC channel exists between an Adapt layer entity and a corresponding RLC layer entity. In the case 3, one RLC channel, one logical channel, or one RLC bearer corresponds to one Adapt layer entity.

13. Routing Selection and Bearer Mapping

The routing selection in the embodiments of this application is used to select a next-hop node for a data packet.

The bearer mapping in the embodiments of this application may also be referred to as QoS mapping. The bearer mapping is used to select an RLC bearer, an RLC channel, or a logical channel for sending a data packet.

14. Header Compression and Header Decompression

Referring to (a) in FIG. 4A and (a) in FIG. 5A, an IP data packet is obtained by encapsulating, through a GTP-U layer, a UDP layer, and an IP layer of a donor-CU, a downlink data packet sent to a terminal (for example, a user plane PDCP PDU sent to the terminal), the IP data packet is transmitted through a wired link between the donor-CU and a donor-DU, and then the IP data packet is sent by the donor-DU on a wireless backhaul link to an IAB node namely, an IAB node 2) accessed by the terminal. At the IAB node 2, an IP header, a UDP header, and a GTP-U header are removed from the data packet, and then the IAB node 2 sends the PDCP PDU of the terminal to the terminal through a radio access link. It can be learned that the data packet during the transmission on the wireless backhaul link has relatively high header overheads. To reduce header overheads of a data packet during transmission on a wireless backhaul link, in the embodiments of this application, a network node may perform header compression and header decompression on the data packet of a terminal. The header compression and the header decompression can reduce the header overheads of the data packet during the transmission on the wireless backhaul link and reduce air interface resource consumption.

The header compression is compressing a protocol layer header of a data packet (for example, an IP data packet). The header decompression is decompressing a compressed protocol layer header. For example, during the header compression, a compressed header may be one or more of an Adapt layer header, an IP layer header, a UDP layer header, an SCTP layer header, and a GTP-U layer header.

In the embodiments of this application, there may be two header compression manners, which are respectively end-to-end header compression and hop-by-hop header compression. The following separately describes the two header compression manners.

The end-to-end header compression is a header compression manner in which header compression is performed only on a transmit side of an access IAB node or a transmit side of a donor node (or a donor-DU). When the header compression is performed on the transmit side of the access IAB node, a node that performs decompression is a receive side of the donor node (or the donor-DU). When the header compression is performed on the transmit side of the donor node (or the donor-DU), a node that performs decompression is a receive side of the access IAB node.

The hop-by-hop header compression is a header compression manner in which header compression is performed on a transmit side of a donor node (or a donor-DU) and a transmit side of each IAB node. When header compression is performed on a transmit side of a node, a node that performs decompression is a receive side of a next-hop node of the node.

It should be noted that, if the header compression manner is the end-to-end header compression, when a network node serving as a receive node on a wireless backhaul link is an access IAB node, a donor node, or a donor-DU, the network node performs a header decompression operation. If the header compression manner is the hop-by-hop header compression, each network node serving as a receive node on a wireless backhaul link performs a header decompression operation.

15. Format of a Header Compression Status Report

Figures 10, 11:
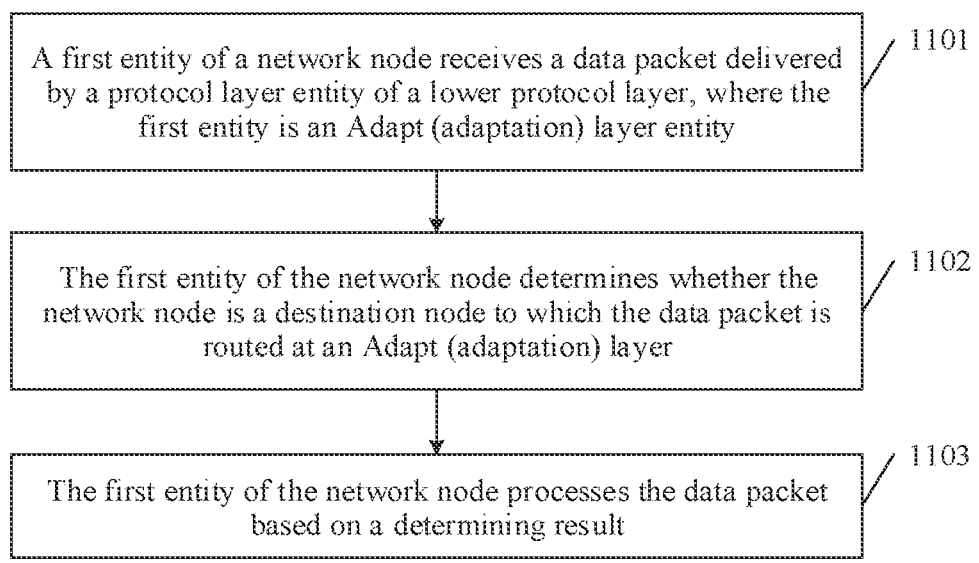
FIG. 10 is a schematic diagram of a format of an adaptation layer status report according to an embodiment of this application.
FIG. 11 is a flowchart of a communication method according to an embodiment of this application.

For example, FIG. 10 shows a format of a header compression status report. Meanings of all fields in the header compression status report are as follows:

Data/Control (D/C): This field is used to identify whether a PDU type of an Adapt PDU (namely, a header compression status report) is a data PDU or a control PDU. For example, the field may have one bit, and when a value of the bit is 0, it indicates that the Adapt PDU is the control PDU, and when a value of the bit is 1, it indicates that the Adapt PDU is the data PDU.

Control information type: The control information type is used to indicate a type of a status report, and the type of the status report may be a header compression status report, a flow control status report, or the like. When an IAB network supports both end-to-end header compression and hop-by-hop header compression, this field may further include header compression manner indication information, and the indication information is used to indicate a header compression manner corresponding to the header compression status report. For example, in a possible implementation, the control information type includes at least two bits, one bit is used to indicate the control information type, and the other bit is used to indicate the header compression manner. In another possible implementation, a bit included in the control information type includes at least three values, one value indicates that the status report is a flow control status report, one value indicates that the status report is a header compression status report in which the header compression manner is the hop-by-hop header compression, and another value indicates that the status report is a header compression status report in which the header compression manner is the end-to-end header compression.

Routing information: This field is used to indicate routing information of the Adapt PDU. For example, the routing information may include an identifier of a destination node that receives the Adapt PDU, and may further include an identifier of a source node that sends the Adapt PDU. For the Adapt control PDU, this field is an optional field. For example, in the hop-by-hop header compression manner, the Adapt control PDU carrying header compression feedback information may not need this field.

Information about an RB of a terminal: This field is an identifier corresponding to an RB of a specific terminal, and is used to indicate the RB of the terminal corresponding to the Adapt PDU. This field is an optional field. For example, when a header compression configuration of an Adapt layer is specific to an IAB node rather than the RB of the terminal, the Adapt control carrying the header compression feedback information may not need this field.

Reserved field: This field is a reserved bit, and may be used to align bytes of Adapt layer header information.

Header compression feedback information: Content of this field is specific header compression feedback content (for example, a robust header compression (ROHC) feedback).

To ensure that a data packet is correctly transmitted on a wireless backhaul link, the embodiments of this application provide communication methods shown in Embodiment 1, Embodiment 2, and Embodiment 3. The following separately describes Embodiment 1, Embodiment 2, and Embodiment 3.

Embodiment 1

In this embodiment, a network node may be an IAB node, a donor node, or a donor-DU.

This embodiment of this application provides a communication method. As shown in FIG. 11, the method includes the following steps.

1101: A first entity of the network node receives a data packet delivered by a protocol layer entity of a lower protocol layer, where the first entity is an Adapt layer entity.

The data packet is a first-type data packet, and the first-type data packet is a data packet including an Adapt layer header and an Adapt layer payload. That is, the data packet received by the first entity of the network node is an Adapt PDU.

The first entity of the network node is located on a receive side. An Adapt layer on the receive side of the network node may include one or more Adapt layer entities, and the first entity of the network node may be any one of the one or more Adapt layer entities. A relatively special case is that if the network node is an intermediate IAB node whose MT and DU share the Adapt layer, the first entity is an Adapt layer entity shared by a transmit side and a receive side of the intermediate IAB node.

For example, the lower protocol layer of the Adapt layer may be an RLC layer, and the protocol layer entity of the lower protocol layer may be an RLC layer entity.

1102: The first entity of the network node determines whether the network node is a destination node to which the data packet is routed at the Adapt layer.

1103: The first entity of the network node processes the data packet based on a determining result.

According to the method provided in Embodiment 1, whether the network node is the destination node of the routing at the Adapt layer directly affects a subsequent data packet processing process. Therefore, according to the method provided in Embodiment 1, the network node processes the data packet based on the determining result of whether the network node is the destination node to which the data packet is routed at the Adapt layer, to correctly process the data packet, thereby avoiding an error in the data packet processing process.

Optionally, a specific implementation of step 1102 includes: determining, by the first entity of the network node whether the network node is the destination node to which the data packet is routed at the Adapt layer based on one or more of routing information in the Adapt layer header of the data packet, whether the Adapt layer header of the data packet includes the routing information, or whether the data packet is a control PDU.

For example, step 1102 may be implemented in any one of the following manner 1 to manner 3.

Manner 1: The first entity of the network node determines, based on the routing information in the Adapt layer header of the data packet, whether the network node is the destination node to which the data packet is routed at the Adapt layer.

In a first possible implementation of the manner 1, the routing information is an identifier of the destination node of the routing at the Adapt layer. In this case, if the identifier that is of the destination node and that is carried in the Adapt layer header of the data packet is an identifier of the network node, the first entity of the network node may determine that the network node is the destination node of the routing at the Adapt layer. Otherwise, the first entity of the network node may determine that the network node is not the destination node of the routing at the Adapt layer.

In a second possible implementation of the manner 1, the routing information is an identifier of a cell served by the destination node of the routing at the Adapt layer. In this case, if the identifier that is of the cell and that is carried in the Adapt layer header of the data packet is an identifier of a cell served by the network node, the first entity of the network node may determine that the network node is the destination node of the routing at the Adapt layer. Otherwise, the first entity of the network node may determine that the network node is not the destination node of the routing at the Adapt layer.

In a third possible implementation of the manner 1, the routing information is an identifier of a transmission path of the routing at the Adapt layer. In this case, if the last node of the transmission path indicated by the identifier that is of the transmission path and that is carried in the Adapt layer header of the data packet is the network node, the first entity of the network node may determine that the network node is the destination node of the routing at the Adapt layer. Otherwise, the first entity of the network node may determine that the network node is not the destination node of the routing at the Adapt layer.

In a fourth possible implementation of the manner 1, the routing information is an identifier of a terminal. In this case, if the identifier that is of the terminal and that is carried in the Adapt layer header of the data packet is an identifier of a terminal served by the network node, the first entity of the network node may determine that the network node is the destination node of the routing at the Adapt layer. Otherwise, the first entity of the network node may determine that the network node is not the destination node of the routing at the Adapt layer.

Manner 2: The first entity of the network node determines, based on whether the Adapt layer header of the data packet includes the routing information, whether the network node is the destination node to which the data packet is routed at the Adapt layer.

In a first case, a previous-hop node of the destination node of the routing at the Adapt layer removes the routing information from the Adapt layer header. In this case, when the first entity of the network node receives the Adapt PDU delivered by the protocol layer entity of the lower protocol layer, if the Adapt layer header of the Adapt PDU does not include a routing information field, the first entity of the network node determines that the network node is the destination node to which the Adapt PDU is routed at the Adapt layer. Otherwise, the first entity of the network node determines that the network node is not the destination node to which the Adapt PDU is routed at the Adapt layer.

In a second case: For an IAB network with a tree (spanning tree) topology, namely, an IAB network in which each IAB node has only one parent node, an Adapt layer header of an uplink Adapt PDU may not carry routing information, and the IAB node only needs to forward the uplink Adapt PDU to the unique parent node, that is, a default routing manner is used.

In the second case, if the network node is the IAB node, when the Adapt layer of the network node receives an uplink Adapt PDU delivered by the protocol layer entity of the lower protocol layer, if an Adapt layer header of the uplink Adapt PDU does not include a routing information field, the first entity of the network node determines that the network node is not the destination node of the routing at the Adapt layer. If the network node is the donor node or the donor-DU, when the Adapt layer of the network node receives an uplink Adapt PDU delivered by the protocol layer entity of the lower protocol layer, if an Adapt layer header of the uplink Adapt PDU does not include a routing information field, the first entity of the network node determines that the network node is the destination node of the routing at the Adapt layer.

Manner 3: The first entity of the network node determines, based on whether the data packet is the control PDU, whether the network node is the destination node to which the data packet is routed at the Adapt layer.

It should be noted that in a scenario in which an IAB network supports hop-by-hop feedback of an Adapt layer status report (for example, a downlink flow control status report or a header compression status report) of the Adapt layer. In this case, each IAB node that receives an Adapt layer status report is a destination node of the Adapt layer status report. Because the Adapt layer status report is the control PDU, the control PDU may not carry routing information. In this case, the first entity of the network node may further determine, based on a PDU type of the Adapt PDU, whether the network node is the destination node to which the Adapt PDU is routed at the Adapt layer. When the Adapt PDU is the control PDU, the first entity of the network node determines that the network node is the destination node to which the Adapt PDU is routed at the Adapt layer. Otherwise, the first entity of the network node further determines, in the manner 1 or the manner 2, whether the network node is the destination node of the routing at the Adapt layer.

The Adapt layer header of the Adapt PDU may include a PDU type indication identifier, and the identifier is used to indicate whether a type of the Adapt PDU is a data. PDU or the control PDU. In this case, the first entity of the network node may determine, based on the identifier, whether the Adapt PDU is the control PDU.

There are two types of determining results in step 1102. One type of determining result is yes (that is, the network node is the destination node to which the data packet is routed at the Adapt layer), and the other type of determining result is no (that is, the network node is not the destination node to which the data packet is routed at the Adapt layer). For different determining results, implementations of step 1103 are different, which are separately described below Case 1: The determining result is yes.

Figure 12:
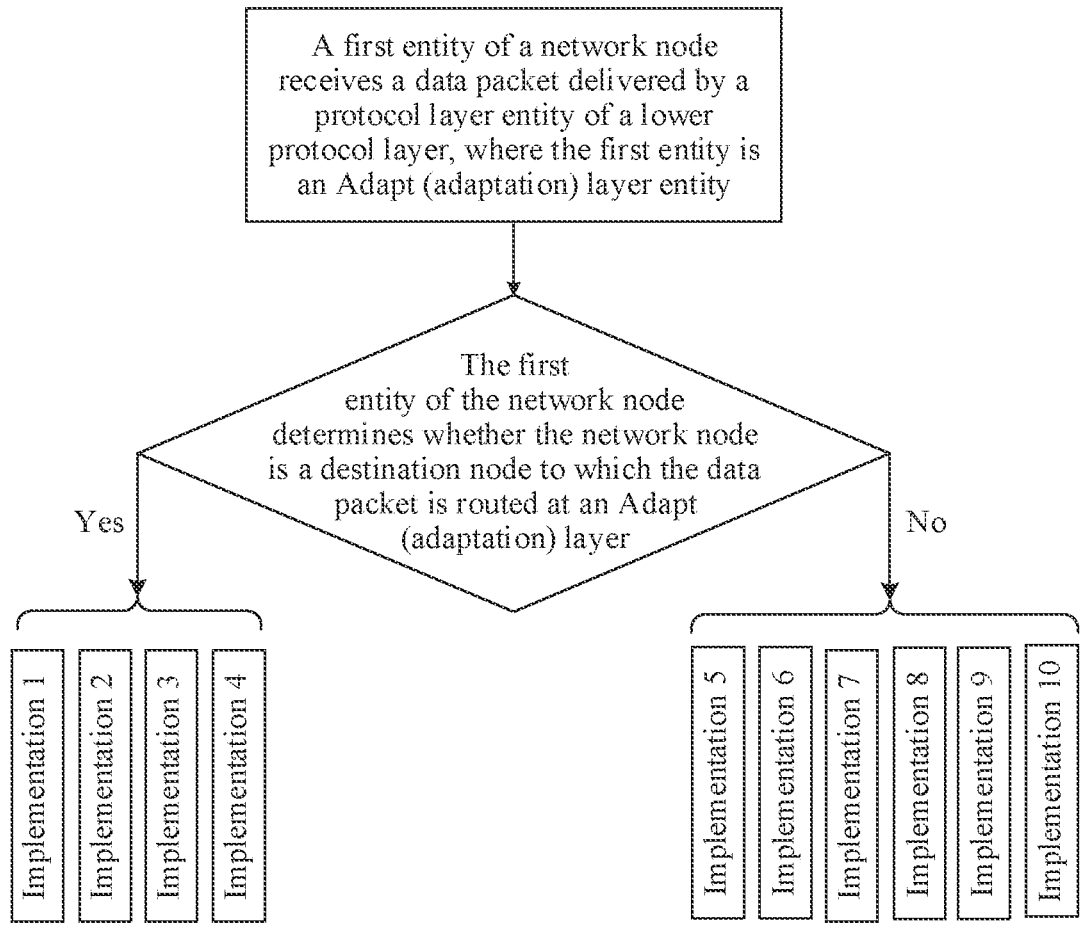
FIG. 12 is a schematic diagram of an implementation of processing a data packet according to an embodiment of this application.

When the determining result is yes, referring to FIG. 12, step 1103 may be implemented in any one of the following implementations 1 to 4. A specific implementation to be used may be determined based on a scenario to which the implementation is applicable.

Implementation 1: The first entity of the network node delivers the Adapt layer payload of the data packet to a second entity, where the second entity is a protocol layer entity of a protocol layer of an F1 interface or a protocol layer entity of an upper protocol layer of the Adapt layer.

A scenario to which the implementation 1 is applicable is that header compression is not performed on the data packet in the IAB network.

During specific implementation of the implementation 1, the first entity of the network node may remove the Adapt layer header from the received data packet to obtain the Adapt layer payload, and then deliver the Adapt layer payload to the second entity.

Implementation 2: The first entity of the network node performs header decompression on the Adapt layer payload of the data packet, and delivers the Adapt layer payload obtained after the header decompression to the second entity.

A scenario to which the implementation 2 is applicable is that header compression is performed on the Adapt layer payload of the data packet in the IAB network.

During specific implementation of the implementation 2, the first entity of the network node may remove the Adapt layer header from the received data packet to obtain the Adapt layer payload, perform the header decompression on the Adapt layer payload, and then deliver the Adapt layer payload obtained after the header decompression to the second entity.

Implementation 3: The first entity of the network node performs header decompression on the data packet, and delivers the Adapt layer payload of the data packet obtained after the header decompression to the second entity.

A scenario to which the implementation 3 is applicable is that header compression is performed on the data packet in the IAB network, and a compressed protocol layer header includes the Adapt layer header.

During specific implementation of the implementation 3, the first entity of the network node may perform the header decompression on the received data packet, and then remove the Adapt layer header from the data packet obtained after the header decompression, to obtain the Adapt layer payload, and then deliver the Adapt layer payload to the second entity.

In the implementation 1 to the implementation 3, the network node may be an access IAB node, a donor node, or a donor-DU. In this case, for example, the second entity may be a protocol layer entity of an IP layer.

In the implementation 1 to the implementation 3, the data packet is the data PDU.

Implementation 4: The first entity of the network node stores the data packet in a buffer of the Adapt layer.

The implementation 4 is applicable to all scenarios.

In the implementation 4, the data packet is the data PDU or the control PDU.

When the data packet is the data PDU, after the first entity of the network node stores the data packet in the buffer of the Adapt layer, the network node may further perform an action in any one of the implementation 1 to the implementation 3. In this case, the network node may be an access IAB node, a donor node, or a donor-DU.

When the data packet is the control PDU, after storing the data packet in the buffer of the Adapt layer, the first entity of the network node processes the Adapt layer payload of the data packet. In this case, the network node may be an intermediate IAB node.

Case 2: The determining result is no.

In the case 2, the data packet is the data PDU or the control PDU, and the network node is an intermediate IAB node. Referring to FIG. 12, step 1103 may be implemented in any one of the following implementations 5 to 10. A specific implementation to be used may be determined based on a scenario to which the implementation is applicable.

Implementation 5: The first entity of the network node delivers the data packet to a third entity, where the third entity is a protocol layer entity of a protocol layer of a wireless backhaul interface or a protocol layer entity of a lower protocol layer of the Adapt layer.

A scenario to which the implementation 5 is applicable is that header compression is not performed on the data packet in the IAB network; or a header compression manner is end-to-end header compression.

In the implementation 5, the third entity is located on a transmit side of the network node. If the network node is an intermediate IAB node whose MT and DU share the Adapt layer, the third entity is a lower protocol layer (for example, an RLC layer entity) of an Adapt layer entity on the transmit side of the network node. If the network node is an intermediate IAB node whose MT and DU do not share the Adapt layer, the third entity is an Adapt layer entity on the transmit side of the network node.

Implementation 6: The first entity of the network node delivers the Adapt layer payload of the data packet and information in the Adapt layer header of the data packet to a third entity, where the third entity is a protocol layer entity of a protocol layer of a wireless backhaul interface or a protocol layer entity of a lower protocol layer of the Adapt layer.

A scenario to which the implementation 6 is applicable is that header compression is not performed on the data packet in the IAB network; or a header compression manner is end-to-end header compression.

During specific implementation of the implementation 6, the first entity of the network node may remove the Adapt layer header from the received data packet to obtain the Adapt layer payload, and then deliver the Adapt layer payload and the information in the Adapt layer header of the data packet to the third entity.

Implementation 7: The first entity of the network node performs header decompression on the Adapt layer payload of the data packet, and delivers, to a third entity, the Adapt layer payload obtained after the header decompression and information in the Adapt layer header of the data packet, where the third entity is a protocol layer entity of a protocol layer of a wireless backhaul interface or a protocol layer entity of a lower protocol layer of the Adapt layer.

A scenario to which the implementation 7 is applicable is that a header compression manner is hop-by-hop header compression, and a previous-hop node of the network node performs header compression on the Adapt layer payload of the data packet.

During specific implementation of the implementation 7, the first entity of the network node may remove the Adapt layer header from the received data packet to obtain the Adapt layer payload, perform the header decompression on the Adapt layer payload, and then deliver, to the third entity, the Adapt layer payload obtained after the header decompression and the information in the Adapt layer header of the data packet.

Implementation 8: The first entity of the network node performs header decompression on the data packet, and delivers, to a third entity, the Adapt layer payload of the data packet obtained after the header decompression and information in the Adapt layer header of the data packet obtained after the header decompression, where the third entity is a protocol layer entity of a protocol layer of a wireless backhaul interface or a protocol layer entity of a lower protocol layer of the Adapt layer.

A scenario to which the implementation 8 is applicable is that a header compression manner is hop-by-hop header compression, a previous-hop node of the network node performs header compression on the data packet, and a compressed protocol layer header includes the Adapt layer header.

During specific implementation of the implementation 8, the first entity of the network node may perform the header decompression on the received data packet, and then remove the Adapt layer header from the data packet obtained after the header decompression, to obtain the Adapt layer payload, and then deliver the Adapt layer payload and the information in the Adapt layer header of the data packet to the third entity.

In the implementations 6 to 8, the third entity is located on the transmit side of the network node. If the network node is an intermediate IAB node whose MT and DU do not share the Adapt layer, the third entity is an Adapt layer entity on the transmit side of the network node.

In the implementations 6 to 8, the information in the Adapt layer header delivered by the first entity of the network node to the third entity may be all information in the Adapt layer header, or may be some information in the Adapt layer header. For the information included in the Adapt layer header, refer to the foregoing descriptions. Details are not described herein again.

Implementation 9: The first entity of the network node first performs header decompression on the data packet (where a used header decompression algorithm corresponds to a header compression algorithm used by a previous-hop node), then performs header compression on the data packet (where a used header compression algorithm corresponds to a header decompression algorithm used by a next-hop node), and then delivers the data packet obtained after the header compression to a third entity.

A scenario to which the implementation 9 is applicable is that a header compression manner is hop-by-hop header compression, the previous-hop node of the network node performs the header compression on the data packet, and a compressed protocol layer header includes the Adapt layer header:

Implementation 10: The first entity of the network node first performs header decompression on the Adapt layer payload of the data packet (where a used header decompression algorithm corresponds to a header compression algorithm used by a previous-hop node), performs header compression on the Adapt layer payload (where a used header compression algorithm corresponds to a header decompression algorithm used by a next-hop node), then adds the Adapt layer header to the Adapt layer payload obtained after the header compression, and delivers, to a third entity, the data packet to which the Adapt layer header is added.

A scenario to which the implementation 10 is applicable is that a header compression manner is hop-by-hop header compression, and the previous-hop node of the network node performs the header compression on the Adapt layer payload of the data packet.

In the implementations 9 and 10, the third entity is located on a transmit side of the network node. The network node is an intermediate IAB node whose MT and DU share the Adapt layer, and the third entity is an RLC layer entity on the transmit side of the network node. The compression algorithm used between the network node and the previous-hop node of the data packet may be the same as or different from the compression algorithm used between the network node and the next-hop node of the data packet. In the foregoing plurality of implementations, for different scenarios, the first entity of the network node may perform different processing on the data packet, and deliver the processed data packet to a corresponding protocol layer, to ensure transmission of an uplink service and a downlink service in the IAB network.

Optionally, the Adapt layer header of the data packet includes a header compression manner indication field, and the header compression manner indication field is used to indicate the header compression manner used by the previous-hop node of the data packet. In this case, the first entity of the network node may determine, based on the header compression manner indication field, whether to perform the header decompression on the data packet.

Specifically, if the header compression manner is the end-to-end header compression, when the network node is an access IAB node, a donor node, or a donor-DU, the network node performs the header decompression on the data packet. If the header compression manner is the hop-by-hop header compression, regardless of a type of the network node, the header decompression is performed on the data packet.

Optionally, the header compression manner indication field corresponds to a terminal (or an RB of the terminal), that is, the indication field is only used to configure a header compression manner of a data packet that corresponds to the terminal (or the RB of the terminal) and that is on a wireless backhaul link. In this case, only when the data packet is the data packet of the terminal (or the RB of the terminal), the network node may perform the header decompression on the data packet. Specifically, whether the header decompression is performed further depends on a type of the network node and the header compression manner. In this embodiment of this application, the access IAB node, the donor node (or the donor-DU), and the intermediate IAB node may be considered as different types of network nodes.

Optionally, the header compression manner indication field corresponds to an IAB node, that is, the indication field is used to configure a header compression manner of a data packet to be sent to the IAB node. In this case, only when the data packet is the data packet to be sent to the IAB node, the network node may perform the header decompression on the data packet. Specifically, whether the header decompression is performed further depends on a type of the network node and the header compression manner.

For example, the header compression manner indication field may have two values, for example, 0 and 1, where 0 indicates that the header compression is not performed, and 1 indicates that the header compression is performed; or 0 indicates the end-to-end header compression manner, and 1 indicates the hop-by-hop header compression manner. The header compression manner indication field may alternatively have at least three values, for example, 00, 01, and 11, where 00 indicates that the header compression is not performed, 01 indicates that the end-to-end header compression is performed, and 11 indicates that the hop-by-hop header compression is performed.

When the first entity of the network node performs the header decompression on the data packet or the Adapt layer payload, to ensure synchronization of context states of a header compression end and a header decompression end, the method may further include: (11) sending, by the first entity of the network node, a header compression status report to a previous-hop node of the network node.

The header compression status report is used to feed back a header compression status, and the header compression status report is the control PDU of the Adapt layer. For a format of the header compression status report, refer to FIG. 10, and the header compression status report may alternatively be in another format. If the header compression end performs the header compression by using the ROHC protocol, the header decompression end may ensure that the context states of the header compression end and the header decompression end are synchronized by sending an ROHC feedback. The ROHC feedback is a payload in the header compression status report. For specific information that needs to be included in the header compression status report, refer to stipulations in the ROHC protocol.

Optionally, before step 1102, the method provided in Embodiment 1 further includes: (21) The first entity of the network node determines the PDU type of the data packet, where the PDU type of the data packet is the data PDU or the control PDU. In this case, if the PDU type of the data packet is the control PDU, the first entity of the network node may directly store the data packet in the buffer of the Adapt layer instead of performing step 1102 and step 1103, and independently process the Adapt layer payload of the data packet.

During specific implementation of step (21), the first entity of the network node may determine the PDU type of the data packet based on VDU type indication information carried in the Adapt layer header of the data packet. For example, the PDU type indication information may be carried in a D/C field in the Adapt layer header of the data packet.

It should be noted that, when the network node is an intermediate IAB node, the intermediate IAB node needs to perform routing selection, to determine the next-hop node of the data packet, and further needs to perform bearer mapping, to determine a service differentiation channel used for sending the data packet. In this case, optionally, the foregoing method further includes any one or more of the following method 1 to method 3.

Method 1: The first entity of the network node determines the next-hop node of the data packet, and the first entity of the network node delivers, to the third entity, information used to indicate the next-hop node.

The information used to indicate the next-hop node may be an identifier of the next-hop node.

In the method 1, the first entity of the network node may determine the next-hop node of the data packet through routing selection. During the routing selection, the first entity of the network node may select a proper next-hop node based on routing information in the Adapt layer header of the data packet and according to a preset routing rule. The routing rule may be preconfigured in the network node by a donor node or a donor-CU, or may be generated by the network node.

For example, the routing information in the Adapt layer header may be an identifier of the destination node of the routing at the Adapt layer, the preset routing rule may be a forwarding table configured in the network node, and the forwarding table includes at least the identifier of the destination node, and an identifier of a next-hop node corresponding to the identifier of the destination node. In this case, a process of performing routing selection by the first entity of the network node may include: determining, based on the identifier that is of the destination node and that is carried in the Adapt layer header, a node corresponding to the identifier of the next-hop node corresponding to the identifier of the destination node in the forwarding table as the next-hop node of the data packet.

Optionally, in the forwarding table, an identifier of one destination node may correspond to identifiers of a plurality of next-hop nodes. In this case, a further selection rule may exist in the forwarding table (for example, different next-hop nodes may respectively correspond to different bearers of the terminal), so that the network node selects, based on more additional information (for example, an identifier of a bearer of the terminal in the Adapt layer header), the next-hop node of the data packet from the identifiers of the plurality of next-hop nodes corresponding to the identifier of the destination node.

In addition to the implementation of the routing selection shown in the example of this application, routing selection may alternatively be implemented in another manner. This is not limited in this application.

Method 2: The first entity of the network node delivers an identifier of a first service differentiation channel to the third entity, where the first service differentiation channel is a service differentiation channel from which the data packet received by the first entity comes; and the service differentiation channel is a logical channel, an RLC channel, or an RLC bearer.

The identifier of the first service differentiation channel may be used by the third entity to determine the next-hop node and/or a second service differentiation channel, and the second service differentiation channel is a service differentiation channel used by the third entity to send the data packet.

Method 3: The first entity of the network node determines a second service differentiation channel for delivering the data packet to the next-hop node of the data packet, and the first entity of the network node delivers an identifier of the second service differentiation channel to the third entity.

In the method 3, the first entity of the network node may determine the second service differentiation channel through bearer mapping. A method for performing the bearer mapping by the first entity of the network node is similar to the manners 1 to 3 in Embodiment 2, and may be understood with reference to Embodiment 2. Details are not described herein again.

When the intermediate IAB node whose MT and DU share the Adapt layer, the routing selection and the bearer mapping are performed by an Adapt layer entity (namely, the first entity) shared by a transmit side and a receive side of the intermediate IAB node. For a method for performing the routing selection by the Adapt layer entity, refer to related descriptions of the method 1. The method for performing the bearer mapping by the Adapt layer entity is similar to the manners 1 to 3 in Embodiment 2, and may be understood with reference to Embodiment 2. Details are not described herein again.

When the intermediate IAB node whose MT and DU do not share the Adapt layer, referring to Table 1, whether a transmit side and a receive side of the intermediate IAB node perform the routing selection and the bearer mapping depends on a specific implementation. For example, there may be three examples shown in Table 1.

TABLE 1

| Example 1 | | Example 2 | | Example 3: | |
| --- | --- | --- | --- | --- | --- |
| Receive side | Transmit side | Receive side | Transmit side | Receive side | Transmit side |
| None | Routing selection and bearer mapping | Routing selection | Bearer mapping | Routing selection and bearer mapping | None |

A scenario to which the example 1 is applicable is that there is only one Adapt layer entity on the transmit side of the network node (namely, the foregoing case 1).

A scenario to which the example 2 is applicable is that there is only one Adapt layer entity on the transmit side of the network node (namely, the foregoing case 1); or the transmit side of the network node includes a plurality of Adapt layer entities, and each Adapt layer entity corresponds to one node that communicates with the network node (namely, the foregoing case 2).

A scenario to which the example 3 is applicable is that there is only one Adapt layer entity on the transmit side of the network node (namely, the foregoing case 1); or the transmit side of the network node includes a plurality of Adapt layer entities, and each Adapt layer entity corresponds to one node that communicates with the network node (namely, the foregoing case 2); or the transmit side of the network node includes a plurality of Adapt layer entities, and one Adapt layer entity corresponds to one RLC layer entity (namely, the foregoing case 3).

The applicable scenarios herein are merely examples. During specific implementation, the scenario to which the example 1, the example 2, or the example 3 is applicable may alternatively be another scenario. This is not limited.

Embodiment 2

Figure 13:
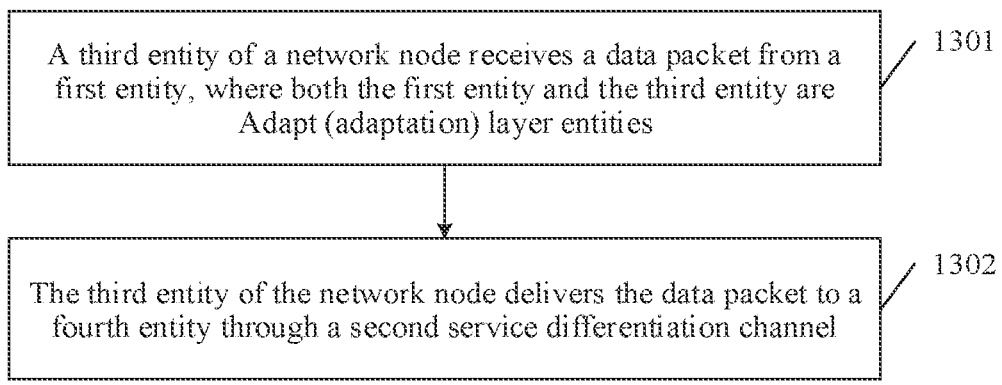
FIG. 13 to FIG. 15 each are a flowchart of a communication method according to an embodiment of this application.

In this embodiment, a network node is an intermediate IAB node, and a DU and an MT of the intermediate IAB node do not share an Adapt layer. Embodiment 2 provides a communication method. As shown in FIG. 13, the method includes the following steps.

1301: A third entity of the network node receives a data packet from a first entity, where both the first entity and the third entity are Adapt layer entities.

The first entity of the network node is located on a receive side of the network node, and the third entity of the network node is located on a transmit side of the network node. The data packet may be a data packet delivered by the first entity of the network node to the third entity in Embodiment 1, and the data packet may be a first-type data packet, or may be a second-type data packet. The first-type data packet is a data packet that includes an Adapt layer header and an Adapt layer payload. The second-type data packet is a data packet that includes an Adapt layer payload.

1302: The third entity of the network node delivers the data packet to a fourth entity through a second service differentiation channel.

The fourth entity is a protocol layer entity, for example, an RLC layer entity, of a lower protocol layer of the Adapt layer. The second service differentiation channel corresponds to a next-hop node of the data packet (that is, the second service differentiation channel is a service differentiation channel of a plurality of service differentiation channels leading to the next-hop node of the data packet), and the service differentiation channel is a logical channel, an RLC channel, or an RLC bearer.

According to the method provided in Embodiment 2, the third entity of the network node delivers the data packet to the fourth entity through the second service differentiation channel corresponding to the next-hop node of the data packet, so that it can be ensured that the data packet is correctly transmitted to the next-hop node of the data packet.

Optionally, when the data packet is the second-type data packet, the method further includes: (11) adding, by the third entity of the network node, an Adapt layer header to the data packet. In this case, step 1302 includes: delivering, by the third entity of the network node to the fourth entity through the second service differentiation channel, the data packet to which the Adapt layer header is added.

It should be noted that, information required by the third entity for adding the Adapt layer header may be sent by the first entity to the third entity together with the Adapt layer payload. In this case, the method further includes: receiving, by the third entity of the network node from the first entity, information in the Adapt layer.

It should be noted that, when the data packet is the second-type data packet, because the second-type data packet has no Adapt layer header, the third entity of the network node may add the Adapt layer header to the data packet. When the data packet is the first-type data packet (namely, an Adapt PDU), because the Adapt PDU has the Adapt layer header, the third entity of the network node may not add the Adapt layer header to the data packet.

Optionally, the method further includes one or more of the following: (21) determining, by the third entity of the network node, the next-hop node for the data packet; or (31) determining, by the third entity of the network node, the second service differentiation channel for the data packet.

Figure 14:
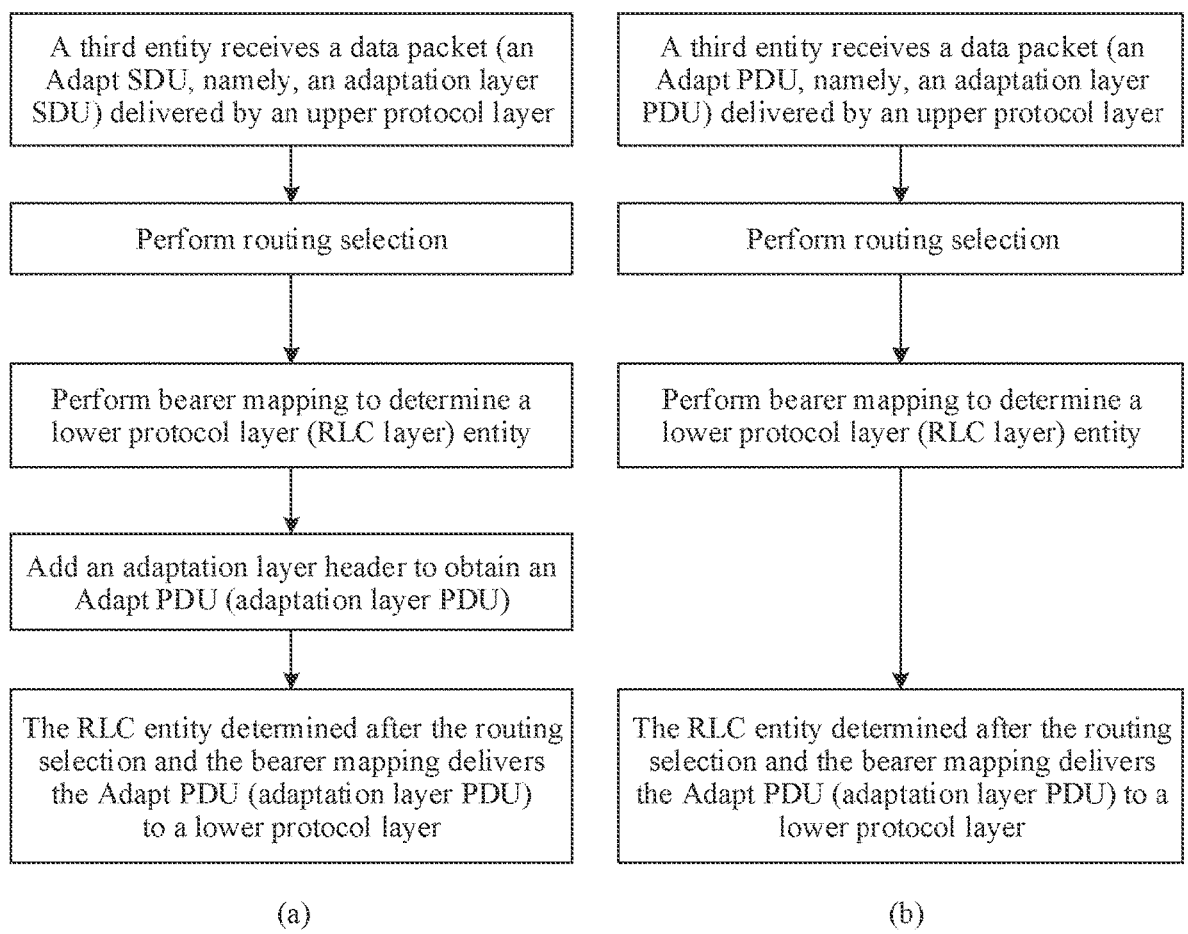

During specific implementation of step (21), the third entity of the network node may determine the next-hop node of the data packet through routing selection. During specific implementation of step (31), the third entity of the network node may determine the second service differentiation channel through bearer mapping. Whether the third entity of the network node performs the routing selection and the bearer mapping is related to an action performed by the first entity. For details, refer to Table 1. Details are not described herein again. For example, referring to (a) and (b) in FIG. 14, FIG. 14 shows two possible procedures in which the third entity processes a data packet.

Step (21) may be implemented in the following manner 1 or manner 2.

Manner 1: The third entity of the network node determines the next-hop node for the data packet.

For a specific implementation of the manner 1, refer to the method 1 in Embodiment 1, and details are not described herein again.

Manner 2: The third entity of the network node receives, from the first entity, information used to indicate the next-hop node; and the third entity of the network node determines the next-hop node based on the information used to indicate the next-hop node.

The information used to indicate the next-hop node may be an identifier of the next-hop node.

Step (31) may be implemented in any one of the following manner 1 to manner 4.

Manner 1: The third entity of the network node determines the second service differentiation channel based on a first service differentiation channel.

During specific implementation of the manner 1, the third entity of the network node may determine the second service differentiation channel based on a correspondence between a service differentiation channel of an ingress link and a service differentiation channel of an egress link. A service differentiation channel of one ingress link may correspond to one or more service differentiation channels of one or more egress links.

Optionally, in the manner 1, the method further includes: receiving, by the third entity of the network node, an identifier of the first service differentiation channel from the first entity The third entity of the network node may determine the first service differentiation channel based on the identifier of the first service differentiation channel.

In a first possible implementation of the manner 1, the third entity of the network node may determine that a service differentiation channel corresponding to the first service differentiation channel is the second service differentiation channel. In this case, a service differentiation channel of an ingress link and a service differentiation channel of an egress link may be in a one-to-one correspondence. The third entity of the network node may determine the second service differentiation channel based on the correspondence and the identifier of the first service differentiation channel.

In the first possible implementation, optionally, the service differentiation channel corresponding to the first service differentiation channel is configured by the network node, a donor node, a donor-CU, or a CU-CP.

In a second possible implementation of the manner 1, a service differentiation channel of one ingress link corresponds to service differentiation channels of a plurality of egress links. In this case, the service differentiation channels of the egress links and next-hop nodes of the data packet may be in a one-to-one correspondence. The third entity of the network node may determine the second service differentiation channel based on the first service differentiation channel and the next-hop node of the data packet. For example, for the correspondence between the service differentiation channel of the ingress link and the service differentiation channel of the egress link, and between the service differentiation channel of the egress link and the next-hop node of the data packet, refer to Table 2. In this case, the third entity of the network node may determine the second service differentiation channel based on the identifier of the first service differentiation channel and the correspondence.

TABLE 2

| Service differentiation channel of an ingress link | Service differentiation channel of an egress link | Node that communicates with the network node |
|---|---|---|
| Service differentiation channel 1 of the ingress | Service differentiation channel 1 of the egress link | Node 1 |

TABLE 2-continued

| Service differentiation channel of an ingress link | Service differentiation channel of an egress link | Node that communicates with the network node |
|---|---|---|
| link | Service differentiation channel 2 of the egress link | Node 2 |
| Service differentiation channel 2 of the ingress link | Service differentiation channel 1 of the egress link | Node 1 |
|  | Service differentiation channel 2 of the egress link | Node 3 |
| Service differentiation channel 3 of the ingress link | Service differentiation channel 1 of the egress link | Node 1 |
|  | Service differentiation channel 2 of the egress link | Node 2 |
|  | Service differentiation channel 3 of the egress link | Node 3 |

Manner 2: The third entity of the network node determines the second service differentiation channel based on an identifier of an RB of a terminal to which the data packet belongs; and/or a correspondence between the RB of the terminal and a service differentiation channel.

During specific implementation of the manner 2, the Adapt layer header of the data packet may include the identifier of the RB of the terminal to which the data packet belongs, and the third entity may determine, based on the identifier of the RB included in the Adapt layer header, that a corresponding service differentiation channel is a service differentiation channel (namely, the second service differentiation channel) for sending the data packet to the next-hop node.

Optionally, the identifier of the RB of the terminal corresponds to a plurality of service differentiation channels, and the third entity of the network node selects a service differentiation channel corresponding to the next-hop node of the data packet as the second service differentiation channel.

The correspondence between the RB of the terminal and the service differentiation channel may be pre-configured in the network node by a donor node, a donor-CU, or a CU-CP, or may be generated by the network node.

Manner 3: The third entity of the network node determines the second service differentiation channel based on a QoS label carried in the data packet and a correspondence between the QoS label and a service differentiation channel.

Optionally, the QoS label carried in the data packet corresponds to a plurality of service differentiation channels, and the third entity of the network node selects a service differentiation channel corresponding to the next-hop node of the data packet as the second service differentiation channel.

The correspondence between the QoS label and the service differentiation channel may be pre-configured in the network node by a donor node, a donor-CU, or a CU-CP, or may be generated by the network node. The QoS label is used to indicate a QoS requirement of the data packet, and the QoS label may be specifically a differentiated services code point (DSCP), a flow label in an IPv6 data packet, a QoS ID representing a QoS requirement of a service corresponding to the data packet, or the like.

Manner 4: The third entity of the network node receives an identifier of the second service differentiation channel from the first entity; and the third entity of the network node determines the second service differentiation channel based on the identifier of the second service differentiation channel.

When the network node needs to perform header compression (in this case, a header compression manner is hop-by-hop header compression), optionally, before the third entity of the network node adds the Adapt layer header to the data packet, the method further includes: performing, by the third entity of the network node, the header compression on the data packet; alternatively, after the third entity of the network node adds the Adapt layer header to the data packet, the third entity of the network node performs the header compression on the data packet to which the Adapt layer header is added. In this case, the delivering, by the third entity of the network node to the fourth entity through the second service differentiation channel, the data packet to which the Adapt layer header is added includes: delivering, by the third entity of the network node to the fourth entity through the second service differentiation channel, the data packet to which the Adapt layer header is added and on which the header compression is performed.

The network node may perform the header compression by using a configured header compression algorithm. For example, on the transmit side, the header compression may be performed by using ROHC.

Because there are two header compression manners, whether header compression is performed on a transmit side of one node and a header compression manner used on the transmit side of the node may be configured by a donor node, a donor-CU, or a CU-CP. For example, the donor-CU may include indication information for configuring the header compression manner and/or a compression algorithm for the header compression in configuration information to be sent to the network node.

A header compression manner indication field sent by the donor-CU to the network node may be carried in an F1AP message sent by the donor-CU to the network node; or when a protocol layer supported by the network node includes an RRC layer, a header compression manner indication field may be carried in an RRC message sent by the donor-CU to the network node (for example, the network node is the intermediate IAB node, the MT of the intermediate IAB node supports the RRC protocol layer, and the donor-CU sends the RRC message to the MT of the intermediate IAB node).

In this case, optionally, the Adapt layer header added by the third entity of the network node includes the header compression manner indication field, and the header compression manner indication field is used to indicate the header compression manner used by the third entity of the network node. In this case, the next-hop node of the data packet determines, based on the indication information, whether to perform header decompression on the data packet.

For other descriptions of the header compression manner indication field, refer to content of a related part in Embodiment 1, and details are not described herein again.

Embodiment 3

In this embodiment, a network node is an access IAB node, and a data packet is an uplink data packet; or a network node is a donor node or a donor-DU, and a data packet is a downlink data packet.

Figure 15:
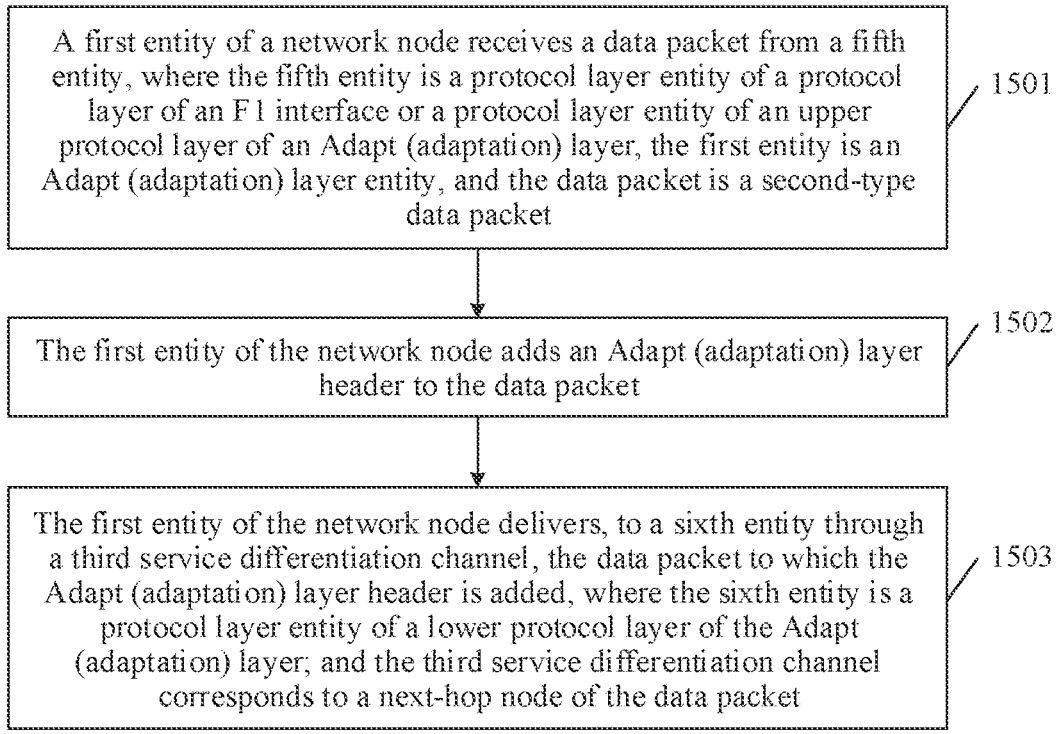

Embodiment 3 provides a communication method. As shown in FIG. 15, the method includes the following steps.

1501: A first entity of the network node receives a data packet from a fifth entity, where the fifth entity is a protocol layer entity of a protocol layer of an F1 interface or a protocol layer entity of an upper protocol layer of an Adapt layer, the first entity is an Adapt layer entity, the data packet is a second-type data packet, and the second-type data packet is a data packet including an Adapt layer payload.

The first entity of the network node is located on a transmit side of the network node. For example, the fifth entity may be a protocol layer entity of an IP layer.

1502: The first entity of the network node adds an Adapt layer header to the data packet.

During specific implementation of step 1502, information required by the first entity of the network node for adding the Adapt layer header may be sent by the fifth entity to the first entity together with the data packet.

1503: The first entity of the network node delivers, to a sixth entity through a third service differentiation channel, the data packet to which the Adapt layer header is added, where the sixth entity is a protocol layer entity of a lower protocol layer of the Adapt layer; the third service differentiation channel corresponds to a next-hop node of the data packet (that is, the third service differentiation channel is a service differentiation channel of a plurality of service differentiation channels leading to the next-hop node of the data packet); and the service differentiation channel is a logical channel, an RLC channel, or an RLC bearer.

For example, the sixth entity may be an RLC layer entity.

According to the method provided in Embodiment 3, the first entity of the network node delivers the data packet to the sixth entity through the third service differentiation channel corresponding to the next-hop node of the data packet, so that it can be ensured that the data packet is correctly transmitted to the next-hop node of the data packet.

Optionally, the method further includes one or more of the following: (11) determining, by the first entity of the network node, the next-hop node of the data packet; or (21) determining, by the first entity of the network node, the third service differentiation channel, During specific implementation of step (11), the first entity of the network node may determine the next-hop node of the data packet through routing selection. During specific implementation of step (21), the first entity of the network node may determine the third service differentiation channel through bearer mapping.

It should be noted that, when the first entity of the network node adds the Adapt layer header only to the data packet, the routing selection and the bearer mapping may be performed by the fifth entity.

Step (11) may be implemented by using a method similar to the: manner 1 (which is not described herein again) in Embodiment 2, or may be implemented by receiving an identifier of the next-hop node from the fifth entity, and determining the next-hop node based on the identifier of the next-hop node.

Step (21) may be implemented by using a method similar to the manner 2 or the manner 3 (which is not described herein again) in Embodiment 2, or may be implemented by receiving an identifier of the third service differentiation channel from the fifth entity, and determining the third service differentiation channel based on the identifier of the third service differentiation channel.

When the network node needs to perform header compression, in a first possible implementation, before step 1502, the method further includes: performing, by the first entity of the network node, the header compression on the data packet. In a second possible implementation, before step 1503, the method further includes: performing, by the first entity of the network node, the header compression on the data packet to which the Adapt layer header is added. Based on the second possible implementation, step 1503 includes: delivering, by the first entity of the network node to the sixth entity through the third service differentiation channel, the data packet to which the Adapt layer header is added and on which the header compression is performed.

The network node may perform the header compression by using a configured header compression algorithm. For example, on the transmit side, the header compression may be performed by using the ROHC protocol.

Because there are two header compression manners, whether header compression is performed on a transmit side of one node and a header compression manner used on the transmit side of the node may be configured by a donor node, a donor-CU, or a CU-CP. For example, the donor-CU may include indication information for configuring the header compression manner and/or a compression algorithm for the header compression in configuration information to be sent to the network node (for example, the access IAB node or the donor-DU).

The configuration information sent by the donor-CU to the donor-DU may be carried in an F1AP message sent by the donor-CU to the donor-DU. The configuration information sent by the donor-CU to the access IAB node may be carried in an F1AP message sent by the donor-CU to a DU of the access IAB node, or carried in an RRC message sent by the donor-CU to an MT of the access IAB node.

Optionally, the Adapt layer header added by the first entity of the network node includes a header compression manner indication field, and the header compression manner indication field is used to indicate the header compression manner used by the first entity of the network node. In this case, the next-hop node of the data packet determines, based on the indication information, whether to perform header decompression on the data packet.

For other descriptions of the header compression manner indication field, refer to content of a related part in Embodiment 1, and details are not described herein again.

It should be noted that the header compression method or the header decompression method in Embodiment 1 to Embodiment 3 may not be coupled to another method in a corresponding embodiment, that is, may be independently performed.

Embodiment 4

Figure 16:
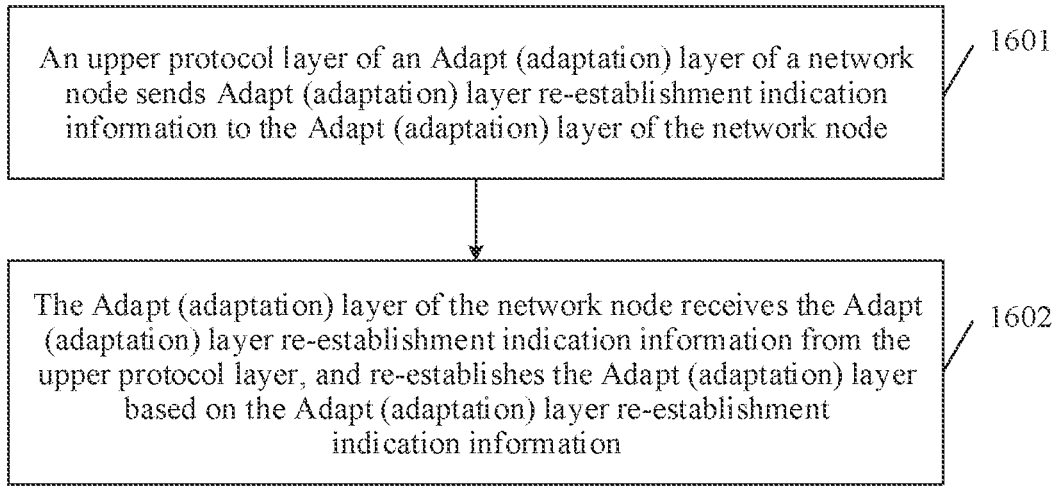
FIG. 16 is a flowchart of an adaptation layer re-establishment method according to an embodiment of this application.

It is considered that a topology of an IAB network may be updated. When the topology of the IAB network is updated, an IAB node may select a new parent node to establish a connection. For example, in the IAB network shown in FIG. 1, if a radio link failure occurs on a wireless backhaul link between the IAB node 5 and the IAB node 2, the IAB node 5 may select the IAB node 4 as a new parent node to establish a wireless backhaul link. When the topology of the IAB network is changed, re-establishment of an Adapt layer of the IAB node further needs to be performed. Therefore, Embodiment 4 provides an Adapt layer re-establishment method. As shown in FIG. 16, the method includes the following steps.

1601: An upper protocol layer of an Adapt layer of a network node sends Adapt layer re-establishment indication information to the Adapt layer of the network node.

During specific implementation of step 1601, the upper protocol layer of the Adapt layer of the network node triggers re-establishment of the Adapt layer.

For example, when an MT of an IAB node includes an RRC layer, the RRC layer of the MT of the IAB node triggers re-establishment of an Adapt layer of the MT. Specifically, the MT of the IAB node may receive an RRC message sent by a donor-CU, where the RRC message includes Adapt layer re-establishment indication information (for example, Adapt-reestablish); and the RRC layer of the MT of the IAB node triggers, based on the Adapt layer re-establishment indication information, the re-establishment of the Adapt layer of the MT, or triggers re-establishment of an Adapt layer of a DU of the IAB node.

For another example, when an IAB node-oriented protocol stack of a donor-DU includes an F1AP layer, the F1AP layer of the donor-DU triggers re-establishment of an Adapt layer of the donor-DU. Specifically, the donor-DU may receive an F1AP message sent by a donor-CU, where the F1AP message includes Adapt layer re-establishment indication information; and the donor-DU triggers, based on the Adapt layer re-establishment indication information, the re-establishment of the Adapt layer of the donor-DU.

For another example, an F1AP layer of a DU of an IAB node triggers re-establishment of an Adapt layer of the DU/an MT of the IAB node. Specifically, the DU of the IAB node may receive an F1AP message sent by a donor-CU, where the F1AP message includes Adapt layer re-establishment indication information; and the DU/MT of the IAB node triggers, based on the Adapt layer re-establishment indication information, the re-establishment of the Adapt layer of the DU/MT of the IAB node.

1602: The Adapt layer of the network node receives the Adapt layer re-establishment indication information from the upper protocol layer, and re-establishes the Adapt layer based on the Adapt layer re-establishment indication information.

During specific implementation, step 1602 may include: configuring, by the Adapt layer of the network node, a new Adapt layer routing and forwarding table and/or a new bearer mapping relationship based on the Adapt layer re-establishment indication information.

The new Adapt layer routing and forwarding table may include a new uplink Adapt layer routing and forwarding table and/or a new downlink Adapt layer routing and forwarding table. The new bearer mapping relationship may be a new mapping relationship between an RB of a terminal and a service differentiation channel of a new egress link, a new mapping relationship between a service differentiation channel of an ingress link and a service differentiation channel of a new egress link, or the like.

Optionally, the method further includes: retransmitting, by the Adapt layer of the network node based on the configured new Adapt layer routing and forwarding table, an unsuccessfully sent data packet to a next-hop node in the new Adapt layer routing and forwarding table, thereby avoiding a packet loss of the terminal. Optionally, the unsuccessfully sent data packet may be a data packet buffered at the Adapt layer of the network node, or may be a data packet that has been delivered by the Adapt layer of the network node to a lower protocol layer, and then returned by the lower protocol layer to the Adapt layer (where the data packet may be a data packet that is not successfully sent by the lower protocol layer).

Whether the network node successfully receives the data packet may be indicated by a lower layer of the Adapt layer of the network node. Optionally, for a transmit side of the network node, if the Adapt layer receives, from a lower protocol layer (for example, an RLC layer), a sending success acknowledgment indication for a data packet (an Adapt PDU, an Adapt SDU, or an RLC SDU), the Adapt layer may discard the data packet according to the indication, to clean up buffer space.

In this optional method, when there is a buffer at the Adapt layer, the Adapt layer may be enabled to effectively perform buffer management and discard a data packet that does not need to be buffered. For example, after receiving an RLC status report fed back from a receive side of a node communicating with the network node, an RLC layer entity on the transmit side of the network node may send, based on data packet acknowledgment (ACK) information indicated in the RLC status report, a sending success acknowledgment indication to an upper protocol layer, namely, the Adapt layer; and the Adapt layer discards a data packet according to the indication, to clean up buffer space.

According to the method provided in Embodiment 4, when the IAB network topology is changed, the Adapt layer of the network node may be re-established, to provide assurance for lossless data transmission, avoid a packet loss problem caused by a topology change of a wireless backhaul link, and improve data transmission reliability.

For beneficial effects of the optional methods in Embodiment 1 to Embodiment 4 of this application, refer to the summary.

The foregoing mainly describes the solutions in the embodiments of this application from a perspective of the method. It may be understood that, to implement the foregoing functions, the network node includes a corresponding hardware structure and/or software module for implementing each function. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function unit division may be performed on the network node based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in the embodiments of this application, the unit division is an example, and is merely logical function division. In an actual implementation, another division manner may be used.

Figure 17:
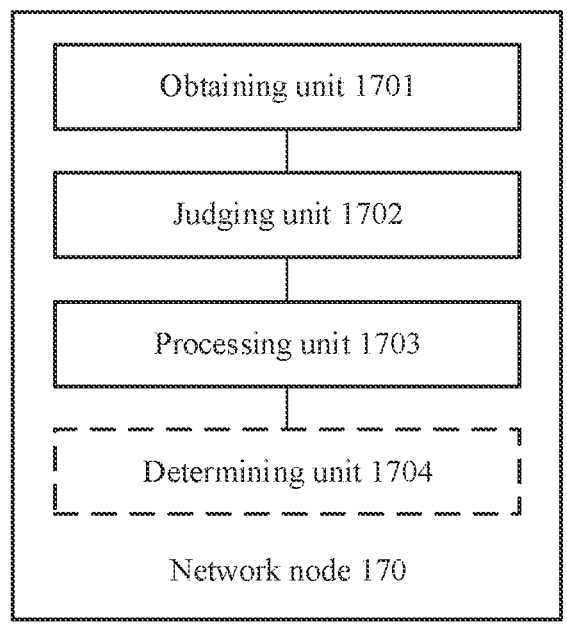
FIG. 17 to FIG. 19 each are a schematic composition diagram of a network node according to an embodiment of this application.

An embodiment of this application further provides a network node (denoted as a network node 170). As shown in FIG. 17, the network node includes:

an obtaining unit 1701, configured to receive a data packet delivered by a protocol layer entity of a lower protocol layer of an adaptation layer of the network node, where the data packet is a first-type data packet, and the first-type data packet is a data packet including an adaptation layer header and an adaptation layer payload;

a judging unit 1702, configured to determine whether the network node is a destination node to which the data packet is routed at the adaptation layer; and a processing unit 1703, configured to process the data packet based on a determining result.

Optionally, the determining result is that the network node is the destination node to which the data packet is routed at the adaptation layer; and the processing unit 1703 is specifically configured to deliver the adaptation layer payload of the data packet to a second entity, where the second entity is a protocol layer entity of a protocol layer of an F1 interface or a protocol layer entity of an upper protocol layer of the adaptation layer.

Optionally, the determining result is that the network node is the destination node to which the data packet is routed at the adaptation layer; and the processing unit 1703 is specifically configured to store the data packet in a buffer of the adaptation layer.

Optionally, the determining result is that the network node is not the destination node to which the data packet is routed at the adaptation layer; and the processing unit 1703 is specifically configured to deliver the data packet to a third entity, where the third entity is a protocol layer entity of a protocol layer of a wireless backhaul interface or a protocol layer entity of a lower protocol layer of the adaptation layer.

Optionally, the determining result is that the network node is not the destination node to which the data packet is routed at the adaptation layer; and the processing unit 1703 is specifically configured to deliver the adaptation layer payload of the data packet and information in the adaptation layer header of the data packet to a third entity, where the third entity is a protocol layer entity of a protocol layer of a wireless backhaul interface or a protocol layer entity of a lower protocol layer of the adaptation layer.

Optionally, the data packet is a data PDU of the adaptation layer.

Optionally, the data packet is a control PDU of the adaptation layer.

Optionally, referring to FIG. 17, the network node further includes a determining unit 1704, where the determining unit 1704 is configured to determine a next-hop node of the data packet, and the processing unit 1703 is further configured to deliver, to the third entity, information used to indicate the next-hop node; and/or the processing unit 1703 is further configured to deliver an identifier of a first service differentiation channel to the third entity, where the first service differentiation channel is a service differentiation channel from which the data packet received by the obtaining unit 1701 comes; and the service differentiation channel is a logical channel, an RLC channel, or an RLC bearer; and/or referring to FIG. 17, the network node further includes a determining unit 1704, where the determining unit 1704 is configured to determine a second service differentiation channel for delivering the data packet to a next-hop node of the data packet; and the processing unit 1703 is further configured to deliver an identifier of the second service differentiation channel to the third entity, where the second service differentiation channel is a service differentiation channel used by the third entity to send the data packet; and the service differentiation channel is a logical channel, an RLC channel, or an RLC bearer.

Optionally, the judging unit 1702 is specifically configured to determine whether the network node is the destination node to which the data packet is routed at the adaptation layer based on one or more of routing information in the adaptation layer header of the data packet, whether the adaptation layer header of the data packet includes the routing information, or whether the data packet is the control PDU.

Optionally, the obtaining unit 1701, the judging unit 1702, the processing unit 1703, and the determining unit 1704 may be located in a first entity of the network node, and the first entity is an adaptation layer entity.

Figure 18:
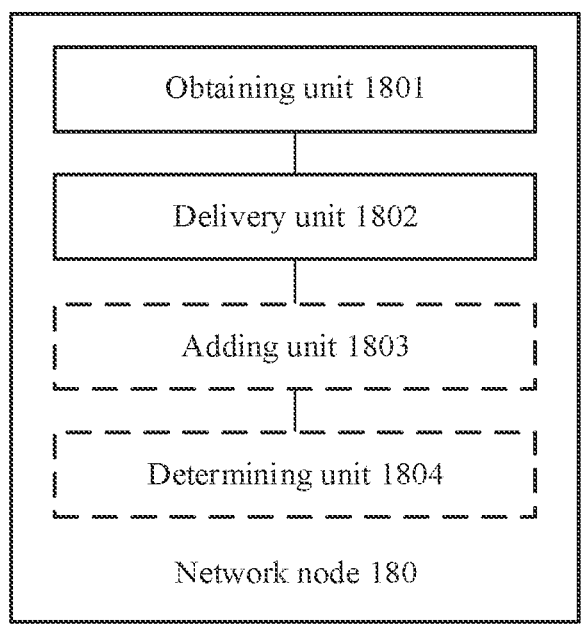

An embodiment of this application further provides a network node (denoted as a network node 180). As shown in FIG. 18, the network node includes:

an obtaining unit 1801, configured to receive a data packet from a first entity, where the first entity is an adaptation layer entity; and a delivery unit 1802, configured to deliver the data packet to a fourth entity through a second service differentiation channel, where the fourth entity is a protocol layer entity of a lower protocol layer of an adaptation layer; the second service differentiation channel corresponds to a next-hop node of the data packet; and the service differentiation channel is a logical channel, an RLC channel, or an RLC bearer.

Optionally, a second-type data packet is a data packet including an adaptation layer payload. When the data packet is the second-type data packet, referring to FIG. 18, the network node further includes:

an adding unit 1803, configured to add an adaptation layer header to the data packet; and the delivery unit 1802 is specifically configured to deliver, to the fourth entity through the second service differentiation channel, the data packet to which the adaptation layer header is added.

Optionally, referring to FIG. 18, the network node further includes a determining unit 1804, where the determining unit 1804 is configured to determine the next-hop node for the data packet; and/or the determining unit 1804 is configured to determine the second service differentiation channel for the data packet.

Optionally, the determining unit 1804 is specifically configured to determine the second service differentiation channel based on a first service differentiation channel, where the first service differentiation channel is a service differentiation channel from which the data packet received by the first entity comes.

Optionally, the determining unit 1804 is specifically configured to: determine the second service differentiation channel based on an identifier of an RB of a terminal to which the data packet belongs; and/or a correspondence between the RB of the terminal and a service differentiation channel.

Optionally, the determining unit 1804 is specifically configured to: determine the second service differentiation channel based on a QoS label carried in the data packet and a correspondence between the QoS label and a service differentiation channel.

Optionally, the determining unit 1804 is specifically configured to determine the second service differentiation channel based on an identifier that is of the second service differentiation channel and that is received from the first entity.

Optionally, the determining unit 1804 is specifically configured to determine the next-hop node based on information that is received from the first entity and that is used to indicate the next-hop node.

Optionally, the obtaining unit 1801, the adding unit 1803, the delivery unit 1802, and the determining unit 1804 may be located in a third entity of the network node, and the third entity is an adaptation layer entity.

Figure 19:
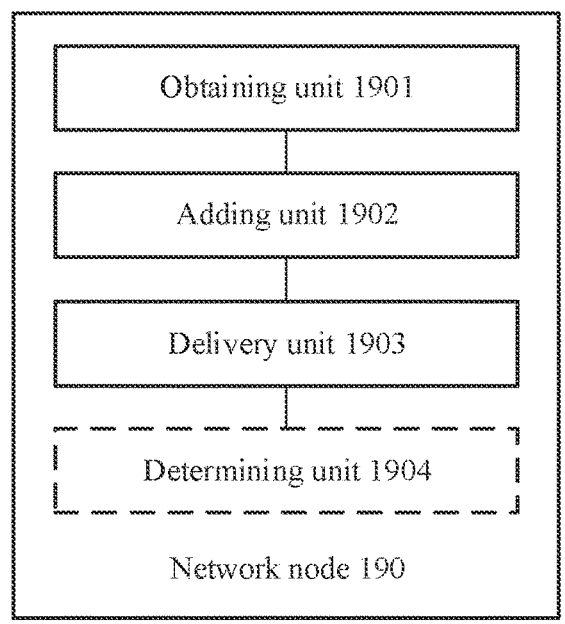

An embodiment of this application further provides a network node (denoted as a network node 190). As shown in FIG. 19, the network node includes:

an Obtaining unit 1901, configured to receive a data packet from a fifth entity, where the fifth entity is a protocol layer entity of a protocol layer of an F1 interface or a protocol layer entity of an upper protocol layer of an adaptation layer, the data packet is a second-type data packet, and the second-type data packet is a data packet including an adaptation layer payload;

an adding unit 1902, configured to add an adaptation layer header to the data packet; and a delivery unit 1903, configured to deliver, to a sixth entity through a third service differentiation channel, the data packet to which the adaptation layer header is added, where the sixth entity is a protocol layer entity of a lower protocol layer of the adaptation layer; the third service differentiation channel corresponds to a next-hop node of the data packet; and the service differentiation channel is a logical channel, an RLC channel, or an RLC bearer.

Optionally, the network node further includes a determining unit 1904, where the determining unit 1904 is configured to determine the next-hop node of the data packet; and/or the determining unit 1904 is configured to determine the third service differentiation channel.

Optionally, the obtaining unit 1901, the adding unit 1902, the delivery unit 1903, and the determining unit 1904 may be located in a first entity of the network node, and the first entity is an adaptation layer entity.

The network node 170, the network node 180, and the network node 190 may be network devices, or may be chips in network devices.

The units in FIG. 17, FIG. 18, and FIG. 19 may also be referred to as modules. For example, the processing unit may be referred to as a processing module. In addition, in the embodiments shown in FIG. 17, FIG. 18, and FIG. 19, names of the units may alternatively not be the names shown in the figures. For example, a unit that receives a data packet may also be referred to as a receiving unit (for example, the obtaining unit 1701 may be referred to as a receiving unit 1701), a unit that delivers a data packet may also be referred to as a sending unit (for example, the delivery unit 1903 may be referred to as a sending unit 1903), and a unit that performs another action may be referred to as a processing unit (for example, the determining unit 1904 may be referred to as a processing unit 1904). The names specifically depend on a module division manner.

When each unit in FIG. 17, FIG. 18, and FIG. 19 is implemented in a form of a software function unit and sold or used as an independent product, the unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of this application. The storage medium that stores the computer software product includes: any medium that can store program code, such as a USB flash drive, a removable hard disk, a read-only memory (ROM), a random access memory (RAM), a magnetic disk, or a compact disc.

Figure 20:
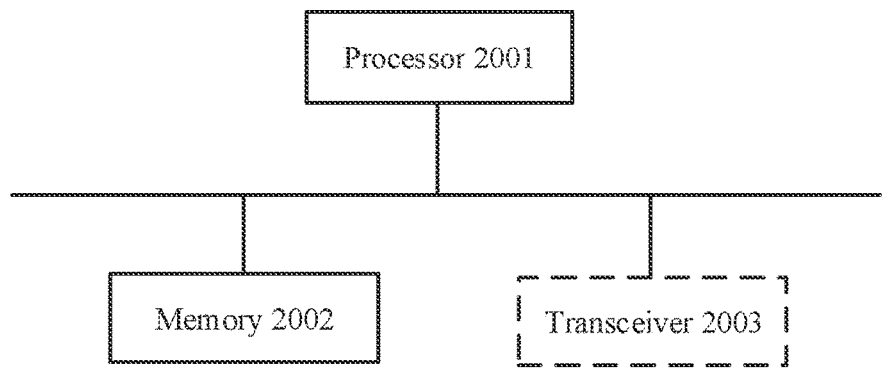
FIG. 20 and FIG. 21 each are a schematic diagram of a hardware structure of a network node according to an embodiment of this application.
Figure 21:
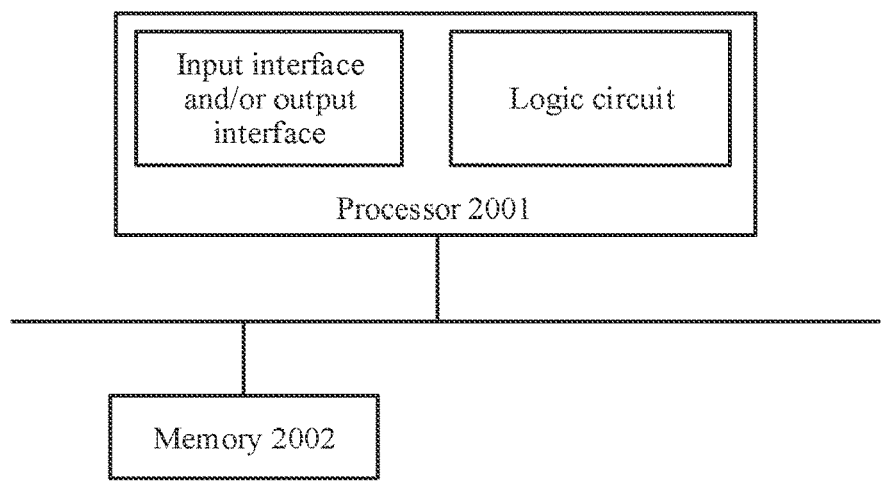

An embodiment of this application further provides a schematic diagram of a hardware structure of a network node (denoted as a network node 200). Referring to FIG. 20 or FIG. 21, the network node 200 includes a processor 2001, and optionally, further includes a memory 2002 connected to the processor 2001.

The processor 2001 may be a general purpose central processing unit (CPU), a microprocessor, an application-specific integrated circuit (ASIC), or one or more integrated circuits configured to control program execution in the solutions in this application. The processor 2001 may alternatively include a plurality of CPUs, and the processor 2001 may be a single-core (single-CPU) processor, or may be a multi-core (multi-CPU) processor. The processor herein may refer to one or more devices, circuits, and/or processing cores configured to process data (for example, a computer program instruction).

The memory 2002 may be a ROM, another type of static storage device that can store static information and an instruction, a RAM, or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. This is not limited in this embodiment of this application. The memory 2002 may exist independently, or may be integrated with the processor 2001. The memory 2002 may include computer program code. The processor 2001 is configured to execute the computer program code stored in the memory 2002, to implement the method provided in the foregoing embodiments of this application.

In a first possible implementation, referring to FIG. 20, the network node 200 further includes a transceiver 2003. The processor 2001, the memory 2002, and the transceiver 2003 are connected through a bus. The transceiver 2003 is configured to communicate with another communications device or another protocol layer in the network node. Optionally, the transceiver 2003 may include a transmitter and a receiver. A component that is in the transceiver 2003 and that is configured to implement a receiving function (for example, receive a data packet delivered by an upper protocol layer) may be considered as the receiver, and the receiver is configured to perform the receiving step in the embodiments of this application. A component that is in the transceiver 2003 and that is configured to implement a sending function (for example, deliver a data packet to another protocol layer) may be considered as the transmitter, and the transmitter is configured to perform the sending or delivering step in the embodiments of this application.

Based on the first possible implementation, the schematic structural diagram shown in FIG. 20 may be used to illustrate a structure of the network node in the foregoing embodiments. The processor 2001 is configured to control and manage an action of the network node. For example, the processor 2001 is configured to support the network node in performing the steps in FIG. 10 to FIG. 16, and/or an action performed by the network node in another process described in the embodiments of this application. The processor 2001 may communicate with another communications device or another protocol layer in the network node through the transceiver 2003 (in this case, when the network node performs the method shown in Embodiment 1 or Embodiment 3, the transceiver 2003 may be located in a first entity; or when the network node performs the method shown in Embodiment 2, the transceiver 2003 may be located in a third entity). The memory 2002 is configured to store program code and data that are of a terminal.

In a second possible implementation, the processor 2001 includes a logic circuit and an input interface and/or an output interface. The output interface is configured to perform a sending or delivering action in a corresponding method, and the input interface is configured to perform a receiving action in a corresponding method.

Based on the second possible implementation, the schematic structural diagram shown in FIG. 21 may be used to illustrate a structure of the network node in the foregoing embodiments. The processor 2001 is configured to control and manage an action of the network node. For example, the processor 2001 is configured to support the network node in performing the steps in FIG. 10 to FIG. 16, and/or an action performed by the network node in another process described in the embodiments of this application. The processor 2001 may communicate with another communications device or another protocol layer in the network node through the input interface and/or the output interface (in this case, when the network node performs the method shown in Embodiment 1 or Embodiment 3, the input interface and/or the output interface may be located in a first entity; or when the network node performs the method shown in Embodiment 2, the input interface and/or the output interface may be located in a third entity). The memory 2002 is configured to store program code and data that are of a terminal.

An embodiment of this application further provides a computer-readable storage medium, including an instruction. When the instruction is run on a computer, the computer is enabled to perform any one of the foregoing methods.

An embodiment of this application further provides a computer program product including an instruction. When the computer program product is run on a computer, the computer is enabled to perform any one of the foregoing methods.

An embodiment of this application further provides a system chip. The system chip is used in a network node, and the system chip includes at least one processor, and a related program instruction is executed in the at least one processor, to perform any method provided in the foregoing embodiments.

An embodiment of this application further provides a communications system, including one or more network nodes provided in the foregoing embodiments.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general purpose computer, a special purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, this specification and the accompanying drawings are merely example descriptions of this application defined by the accompanying claims, and are considered as any of or all modifications, variations, combinations, or equivalents that cover the scope of this application. It is clear that a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A communication apparatus, comprising:
   at least one processor coupled to one or more memories storing programming instructions for execution by the at least one processor to perform operations comprising:
   receiving, by a first adaptation layer entity at an adaptation layer in the communication apparatus, a data packet from a lower layer entity at a protocol layer that is lower than the adaptation layer in the communication apparatus, wherein the data packet comprises an adaptation layer header and an adaptation layer payload;
   determining whether the communication apparatus is a destination node that the data packet is routed to at the adaptation layer; and
   in response to determining that the communication apparatus is the destination node, sending the adaptation layer payload of the data packet to an upper layer entity at a protocol layer that is upper than the adaptation layer in the communication apparatus.

2. The communication apparatus according to claim 1, wherein the operations further comprising:
   in response to determining that the communication apparatus is not the destination node, sending the data packet to a second adaptation layer entity at the adaptation layer in the communication apparatus.

3. The communication apparatus according to claim 1, wherein the operations further comprising:
   in response to determining that the communication apparatus is not the destination node, sending the adaptation layer payload of the data packet and information comprised in the adaptation layer header of the data packet to a second adaptation layer entity at the adaptation layer in the communication apparatus.

4. The communication apparatus according to claim 1, wherein the data packet is a data protocol unit (PDU) of the adaptation layer.

5. The communication apparatus according to claim 2, wherein the operations further comprising:
determining a next-hop node of the data packet; and
indicating the next-hop node to the second adaptation layer entity.

6. The communication apparatus according to claim 2, wherein the operations further comprising:
sending an identifier of a first radio link control (RLC) channel to the second adaptation layer entity, wherein the first adaptation layer entity receives the data packet through the first RLC channel.

7. The communication apparatus according to claim 2, wherein the operations further comprising:
determining a second radio link control (RLC) channel for sending the data packet to a next-hop node of the data packet; and
sending an identifier of the second RLC channel to the second adaptation layer entity, wherein the second adaptation layer entity sends the data packet through the second RLC channel.

8. The communication apparatus according to claim 1, wherein an identifier of the destination node comprised in the adaptation layer header is the identifier of the communication apparatus, and wherein the communication apparatus is determined as the destination node.

9. The communication apparatus according to claim 1, wherein an identifier of the destination node comprised in the adaptation layer header is not an identifier of the communication apparatus, and wherein the communication apparatus is determined as not the destination node.

10. The communication apparatus according to claim 1, wherein the operations further comprising:
determining a protocol data unit (PDU) type of the data packet based on PDU type indication information comprised in the adaptation layer header of the data packet, the PDU type indication information indicating the PDU type of the data packet, and the PDU type of the data packet being a data PDU or a control PDU.

11. The communication apparatus according to claim 10, wherein the PDU type of the data packet is determined by the first adaptation layer entity as the data PDU.

12. A communication method, comprising:
receiving, by a first adaptation layer entity at an adaptation layer in a network node, a data packet from a lower layer entity at a protocol layer that is lower than the adaptation layer in the network node, wherein the data packet comprises an adaptation layer header and an adaptation layer payload;
determining whether the network node is a destination node that the data packet is routed to at the adaptation layer; and
in response to determining that the network node is the destination node, sending the adaptation layer payload of the data packet to an upper layer entity at a protocol layer that is upper than the adaptation layer in the network node.

13. The method according to claim 12, wherein the method further comprises:
in response to determining that the network node is not the destination node, sending the data packet to a second adaptation layer entity at the adaptation layer in the network node.

14. The method according to claim 12, wherein an identifier of the destination node comprised in the adaptation layer header is the identifier of the network node, and wherein the network node is determined as the destination node.

15. The method according to claim 12, wherein an identifier of the destination node comprised in the adaptation layer header is not an identifier of the network node, and wherein the network node is determined as not the destination node.

16. The communication apparatus according to claim 2, wherein the first adaptation layer entity is on a receive side of the communication apparatus and the second adaptation layer entity is on a transmit side of the communication apparatus.

17. The communication apparatus according to claim 3, wherein the first adaptation layer entity is on a receive side of the communication apparatus and the second adaptation layer entity is on a transmit side of the communication apparatus.

18. The method according to claim 13, wherein the first adaptation layer entity is on a receive side of the network node and the second adaptation layer entity is on a transmit side of the network node.

19. A non-transitory, computer-readable medium storing one or more instructions executable by at least one processor to perform operations comprising:
receiving, by a first adaptation layer entity at an adaptation layer in a network node, a data packet from a lower layer entity at a protocol layer that is lower than the adaptation layer in the network node, wherein the data packet comprises an adaptation layer header and an adaptation layer payload;
determining whether the network node is a destination node that the data packet is routed to at the adaptation layer; and
in response to determining that the network node is the destination node, sending the adaptation layer payload of the data packet to an upper layer entity at a protocol layer that is upper than the adaptation layer in the network node.

20. The non-transitory, computer-readable medium according to claim 19, wherein the operations further comprise:
in response to determining that the network node is not the destination node, sending the data packet to a second adaptation layer entity at the adaptation layer in the network node.

* * * * *